(12) United States Patent
Schultz et al.

(10) Patent No.: US 11,074,323 B2
(45) Date of Patent: Jul. 27, 2021

(54) METHOD AND SYSTEM FOR PERSISTING FILES

(71) Applicant: MICROSOFT TECHNOLOGY LICENSING, LLC, Redmond, WA (US)

(72) Inventors: Benjamin M. Schultz, Redmond, WA (US); Balaji Balasubramanyan, Redmond, WA (US); Giridhar Viswanathan, Redmond, WA (US); Ankit Srivastava, Redmond, WA (US); Margarit Simeonov Chenchev, Redmond, WA (US); Hari R. Pulapaka, Redmond, WA (US); Nived Kalappuraikal Sivadas, Redmond, WA (US); Raphael Gianotti Serrano dos Santo, Redmond, WA (US); Narasimhan Ramasubramanian, Redmond, WA (US); Frederick Justus Smith, Redmond, WA (US); Matthew David Kurjanowicz, Redmond, WA (US); Prakhar Srivastava, Redmond, WA (US); Jonathan Schwartz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 16/015,064

(22) Filed: Jun. 21, 2018

(65) Prior Publication Data

US 2019/0180003 A1 Jun. 13, 2019

Related U.S. Application Data

(63) Continuation-in-part of application No. 15/894,745, filed on Feb. 12, 2018, now Pat. No. 10,885,193.

(Continued)

(51) Int. Cl.
*G06F 21/10* (2013.01)
*G06F 21/62* (2013.01)
(Continued)

(52) U.S. Cl.
CPC .......... *G06F 21/105* (2013.01); *G06F 16/116* (2019.01); *G06F 16/1748* (2019.01);
(Continued)

(58) Field of Classification Search
CPC .. G06F 21/105; G06F 21/602; G06F 21/6218; G06F 17/30076; G06F 17/30156;
(Continued)

(56) References Cited

U.S. PATENT DOCUMENTS 5,579,222 A * 11/1996 Bains .................. G06F 11/34
705/16
9,143,530 B2 9/2015 Qureshi et al.
(Continued)

FOREIGN PATENT DOCUMENTS

EP 2782038 A1 9/2014

OTHER PUBLICATIONS

"International Search Report and Written Opinion Issued in PCT Application No. PCT/US2018/062378", dated Jan. 30, 2019, 11 Pages.

(Continued)

*Primary Examiner* — Kevin Bechtel
*Assistant Examiner* — Sangseok Park
(74) *Attorney, Agent, or Firm* — Liang IP, PLLC

(57) ABSTRACT

Securely performing file operations. A method includes determining a licensing characteristic assigned to a file. When the licensing characteristic assigned to the file meets or exceeds a predetermined licensing condition, then the method includes performing a file operation on the file in a host operating system while preventing the file operation (Continued)

from being performed in the guest operating system. When the licensing characteristic assigned to the file does not meet or exceed the predetermined licensing condition, then the method includes performing the file operation on the file in the guest operating system while preventing the file operation from being performed directly in the host operating system.

20 Claims, 16 Drawing Sheets

Related U.S. Application Data

(60) Provisional application No. 62/596,033, filed on Dec. 7, 2017.

(51) Int. Cl.
    *G06F 21/60*     (2013.01)
    *G06F 16/11*     (2019.01)
    *G06F 16/174*     (2019.01)
    *G06F 21/53*     (2013.01)

(52) U.S. Cl.
    CPC .......... *G06F 21/53* (2013.01); *G06F 21/602* (2013.01); *G06F 21/6218* (2013.01); *G06F 2221/0759* (2013.01); *G06F 2221/2113* (2013.01)

(58) Field of Classification Search
    CPC ...... G06F 21/57; G06F 21/53; G06F 21/6209; G06F 16/16; G06F 2221/2113
    See application file for complete search history.

(56) References Cited

U.S. PATENT DOCUMENTS

| | | |
|---|---|---|
| 9,152,790 B1 | 10/2015 | Glick et al. |
| 2002/0194010 A1* | 12/2002 | Bergler ................. G06Q 10/10 705/310 |
| 2004/0010440 A1 | 1/2004 | Lenard et al. |
| 2004/0123117 A1 | 6/2004 | Berger |
| 2005/0257265 A1 | 11/2005 | Cook et al. |
| 2005/0257266 A1 | 11/2005 | Cook et al. |
| 2006/0004667 A1* | 1/2006 | Neil ...................... G06F 21/126 705/59 |
| 2006/0294102 A1 | 12/2006 | Reddish et al. |
| 2007/0180509 A1 | 8/2007 | Swartz et al. |
| 2009/0165133 A1 | 6/2009 | Hwang et al. |
| 2009/0328056 A1 | 12/2009 | McCune et al. |
| 2010/0175104 A1 | 7/2010 | Khalid |
| 2010/0251389 A1 | 9/2010 | Mizutani |
| 2010/0332401 A1 | 12/2010 | Prahlad et al. |
| 2011/0072274 A1 | 3/2011 | Leoutsarakos et al. |
| 2011/0145926 A1 | 6/2011 | Dalcher et al. |
| 2013/0055401 A1 | 2/2013 | Kim et al. |
| 2014/0020113 A1 | 1/2014 | Shah et al. |
| 2014/0040979 A1 | 2/2014 | Barton et al. |
| 2014/0282890 A1 | 9/2014 | Li et al. |
| 2015/0040182 A1* | 2/2015 | Chambers ............... G06F 21/10 726/1 |
| 2015/0121536 A1 | 4/2015 | King et al. |
| 2015/0143374 A1 | 5/2015 | Banga et al. |
| 2015/0163206 A1 | 6/2015 | Mccarthy et al. |
| 2015/0310188 A1 | 10/2015 | Ford et al. |
| 2016/0188909 A1* | 6/2016 | Zatko ...................... G06F 21/35 726/26 |
| 2017/0041296 A1 | 2/2017 | Ford et al. |
| 2017/0163654 A1* | 6/2017 | Peppe ................... G06F 21/606 |
| 2017/0223024 A1 | 8/2017 | Desai et al. |
| 2018/0262509 A1 | 9/2018 | Li et al. |
| 2018/0293394 A1* | 10/2018 | Gunda ................ G06F 9/45558 |
| 2018/0307812 A1* | 10/2018 | Boldin .................... G06F 21/31 |
| 2018/0349576 A1 | 12/2018 | Dasgupta et al. |
| 2019/0347420 A1 | 11/2019 | Schultz et al. |

OTHER PUBLICATIONS

"International Search Report and Written Opinion Issued in PCT Application No. PCT/US2018/062379", dated Jan. 30, 2019, 11 Pages.
"Mark of the Web", Retrieved from: https://blogs.msdn.microsoft.com/ie/2005/03/07/mark-of-the-web/, Mar. 7, 2005, 15 Pages.
"Access control list", Retrieved from: https://en.wikipedia.org/wiki/Access_control_list, Retrieved date: Nov. 21, 2017, 3 Pages.
"Non Final Office Action Issued in U.S. Appl. No. 15/894,745", dated Nov. 18, 2019, 25 Pages.
"Notice of Allowance Issued in U.S. Appl. No. 15/894,745", dated Mar. 5, 2020, 9 Pages.
Huchton, et al., "Building and Evaluating a k-Resilient Mobile Distributed File System Resistant to Device Compromise", In Military Communications Conference, Nov. 2011, pp. 1315-1320.
Li, et al., "Usable Mandatory Integrity Protection for Operating Systems", In Proceedings of IEEE Symposium on Security and Privacy, May 2007, 15 Pages.
"Final Office Action issued in U.S. Appl. No. 15/977,680", dated Jul. 14, 2020, 23 Pages.
"Notice of Allowance Issued in U.S. Appl. No. 15/894,745", dated Jun. 4, 2020, 10 Pages.
Ko et al., "Flogger: A File-centric Logger for Monitoring File Access and Transfers within Cloud Computing Environments", In Proceedings of the IEEE 10th International Conference on Trust, Security and Privacy in Computing and Communications, Nov. 16, 2011, pp. 765-771.
Liu et al., "Trust-based Dynamic Access Control Model for P2P Network", In Proceedings of the International Conference on Communications, Circuits and Systems, Jun. 25, 2006, pp. 1542-1546.
"Non Final Office Action Issued in U.S. Appl. No. 15/977,680", dated Feb. 27, 2020, 31 Pages.
"International Search Report and Written Opinion Issued in PCT Application No. PCT/US19/030509", dated Jun. 27, 2019, 13 Pages.
Wen, et al., "A Survey of Virtualization Technologies Focusing on Untrusted Code Execution", In Proceedings of the 5th International Conference on Innovative Mobile and Internet Services in Ubiquitous Computing, Jul. 4, 2012, pp. 378-383.
"Non Final Office Action Issued in U.S. Appl. No. 15/977,680", dated Feb. 23, 2021, 24 Pages.
"Notice of Allowance Issued in U.S. Appl. No. 15/894,745", dated Sep. 17, 2020, 10 Pages.
Goldman, et al., "Cryptographically-Curated File System (CCFS): Secure, Inter-Operable, and Easily Implementable Information-Centric Networking", In Proceedings of 39th Annual IEEE Conference on Local Computer Networks, Sep. 8, 2014, pp. 142-149.

* cited by examiner

METHOD AND SYSTEM FOR PERSISTING FILES

CROSS-REFERENCE TO RELATED APPLICATIONS

This application is a continuation-in-part of U.S. patent application Ser. No. 15/894,745 filed on Feb. 12, 2018, entitled "Method and System for Persisting Untrusted Files," which claims the benefit of and priority to U.S. Provisional Patent Application Ser. No. 62/596,033 filed on Dec. 7, 2017, and entitled "Method and System for Persisting Untrusted Files," both of which applications are incorporated herein by reference in their entireties.

BACKGROUND

Background and Relevant Art

Computers and computing systems have affected nearly every aspect of modern living. Computers are generally involved in work, recreation, healthcare, transportation, entertainment, household management, etc.

Virtual machine-based virtualization provides many of the isolation benefits of physical machines while offering flexibility and density. Container-based virtualization provides a lighter weight virtualization environment, improved compatibility, and lower operational costs. In a containerized based configuration approach, various hierarchical configuration layers are used to configure entities such as containerized operating systems. Additionally, filters can be applied to configuration layers to accomplish the desired configuration for an entity. In particular, an entity, such as a container operating system kernel, can have different portions of different configuration layers exposed to it from a host operating system such that configuration from different configuration layers can be used to configure the containerized entity, but where the containerized entity operates as if it is running in its own pristine environment, even though it is using physical elements from the host operating system. Thus, a given configuration layer could be used as part of a configuration for multiple different containerized entities thus economizing storage, network, and compute resources by multi-purposing them for different container operating systems.

As intimated above, containers achieve their lightweight attributes through sharing aspects of the host operating system. This may include sharing of files and folders, sharing configuration, sharing devices, and sharing operating system services (sometimes referred to as daemons). In some environments, such as friendly multi-tenant hosting, systems may de-duplicate overlapping processes, enabling even more efficient resource utilization. Operating system services are a contributor to process overlap.

Lately, container technology has gained significant popularity. Developers and IT administrators are attracted to the benefits of containers, including software isolation and software compatibility. As containers are inexpensive to create and destroy, their lifecycle in some scenarios is much shorter than a typical operating system. Despite the benefits listed above, a common problem that many applications need to solve when running in a container environment is how to persist files and state for a container without the fear of repercussions on the host. This can be due to files being untrusted or having licensing restrictions. Opening files should be accomplished in a manner that is consistent with the expected user experience (UX).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing system comprising a host operating system and a guest operating system operating in the host operating system. The method includes acts for securely performing file operations. The method includes determining a licensing characteristic or trust characteristic assigned to a file. When the licensing characteristic or trust characteristic assigned to the file meets or exceeds a predetermined licensing condition or trust condition, then the method includes performing a file operation on the file in the host operating system while preventing the file operation from being performed in the guest operating system. When the licensing characteristic or trust characteristic assigned to the file does not meet or exceed the predetermined licensing condition or trust condition, then the method includes performing the file operation on the file in the guest operating system while preventing the file operation from being performed directly in the host operating system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 12 FIG. 8 illustrates another method for causing a file to be copied safely;

DETAILED DESCRIPTION

Figure 1A:
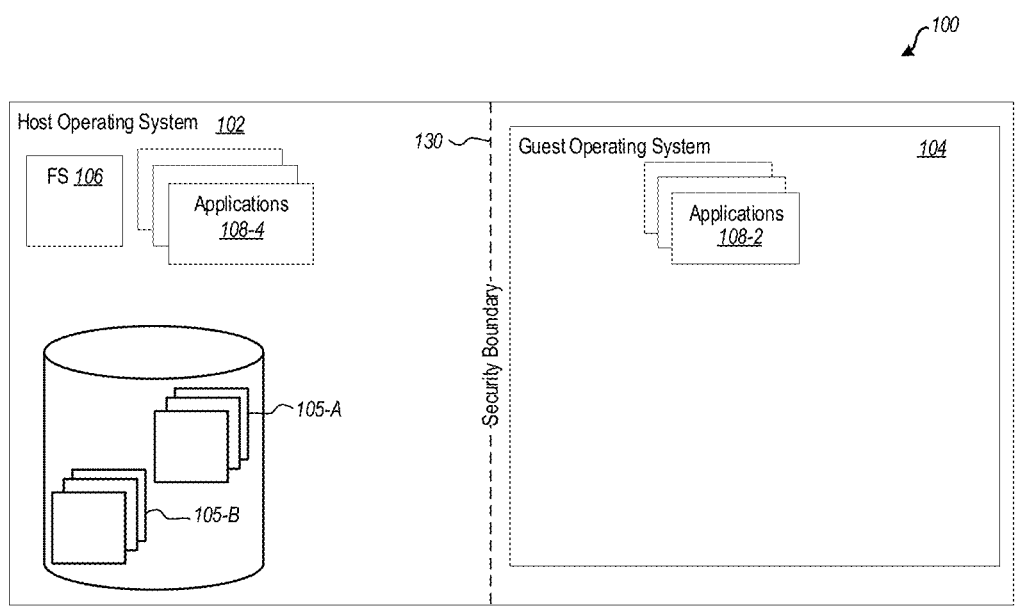
FIG. 1A illustrates a computing system having a host operating system and a guest operating system configured to operate on files in the guest operating system according to a trust characteristic.

To implement desired user experience scenarios, users need to download, persist, share, copy, and/or open potentially untrusted files or files subject to certain licensing conditions (e.g., digital rights managed (DRMed) files) and app state. Users and apps expect seamless access to files that transcends isolation barriers that are imposed for security and/or licensing. However, security and/or licensing requires the system to enforce and track files and only allow access in specific circumstances. Embodiments illustrated herein may be implemented to facilitate compatibility, security, and/or license enforcement.

For example, various embodiments of the invention may implement one or more of the following features:

A secure environment in which to run apps and open files.

A mechanism to determine what files are "safe" and "not safe".

A mechanism to determine licensing restrictions for files.

A mechanism to classify and track files by type and location.

A mechanism to manage and configure file settings and classifications.

A mechanism to quarantine unsafe files.

A mechanism to cleanse files that are not safe.

A mechanism to manage the policies of persisting the types of files and the how to handle different types of the files.

A mechanism to control which persisted files are exposed into a guest.

Embodiments may be further configured to allow for various security technologies (either existing or custom-made enhancements intended to be used directly with embodiments of the invention) to be used in context with embodiments of the invention. In particular, embodiments of the invention can add an additional layer of security to existing protections or newly enabled protections.

Thus, embodiments illustrated herein implement an improved computing system which provides improved security and malware protection over previous computing systems. Alternatively or additionally, an improved computing system that improves controls over where files may be operated on based on licensing may be implemented. In particular, files may be licensed for use on a particular operating system. This may be accomplished using DRM requirements for the files.

Note that when operating on a file is discussed below, it should be appreciated that any one of a number of different file operations (or combinations of file operations) may be intended. Thus, for example, in the description below, if a file is allowed to be operated on, that may refer to the ability to open the file. Alternatively, that may refer to the ability to open and save the file. Alternatively, that may refer to the ability to open, save, and copy the file. Note that some file operations may be allowed, while others are disallowed and/or prevented. For example, even though a licensing restriction or trust characteristic may allow a file to be opened on a particular operating system, other licensing restrictions or trust characteristics may prevent copying on the same operating system. Thus, being allowed to perform an operation, does not necessarily mean that any and all operations are allowed. Examples of operations that may be performed on files may include, for example, read, write, copy, save, and/or share.

Note that the embodiments below illustrate the secure computing system in the context of a host operating system and one or more guest operating systems. In the examples below, it is generally assumed that the host operating system is a 'secure' operating system where only trusted files are opened and that the guest operating system is an 'insecure' operating system where untrusted files can be opened. However, it should be appreciated that embodiments of the invention contemplate other scenarios. For example, there are scenarios in which the inverse is assumed, e.g. a 'secure guest' running on an 'insecure' host. Thus, the examples below should not be read to limit secure operating systems to host operating systems and insecure operating systems to containerized or virtual operating systems operating on those host operating systems. Note that secure and insecure are relative terms. That is, a secure operating system is more secure than an insecure operating system, which is less secure than the secure operating system.

Mark of the Web (MOTW)

The Mark of the Web (MOTW) is a feature of the Edge and Windows Internet Explorer web browsers available from Microsoft Corporation of Redmond, Wash. that enhances security. MOTW enables Edge and Internet Explorer to force webpages to run in the security zone of the location the page was saved from, as long as that security zone is more restrictive than the Local Machine zone, instead of the Local Machine zone. Because the Local Machine zone has so few security restrictions, active HTML documents running on the local machine have access to the computer's entire file system. The MOTW helps Internet Explorer protect the user from the risks of running these documents in the Local Machine zone. By referencing the MOTW, Internet Explorer can force these webpages into a zone that has more restrictions, such as the Internet zone. While MOTW provides a method of file classification, it doesn't provide a method to track files. Some embodiments may use MOTW or similar methods to glean additional information about a file and/or assess a file's level of trust.

File marking/tagging/Access Control Lists(ACLs)

File System flags/tags/ACLs can be used to persist a file's level of trust and/or licensing requirements. As will be illustrated in more detail below, this marking can be used to determine where a file can have various operations, such as open, copy and/or save, performed on them. This may be performed by having metadata in a header of the file, an accompanying metadata file for a file, in an access control list, or by other appropriate means.

Note that some embodiments may have different and/or additional methods for persisting a file's level of trust and/or licensing requirements. In one embodiment, a database or ledger tracks a file and stores the metadata in a cache on the host operating system. In another embodiment, this is tracked by a management service that may reside on the host operating system or on a remote computer that monitors the host operating system. Files may be uniquely identified by a set of known characteristics including filename, folder name, most recent saved date, file size, file checksum, file cyclical redundancy check, file location on disk, disk hardware unique identifiers, user identity who created/last modified the file, app that created/last modified the file, server or resource from which the file originated, etc. The location (database, ledger, management service, etc.) that stores a file's level of trust and/or licensing requirements then monitors (and enforces) filesystem transactions on one or more host operating systems. In some embodiments this is tightly integrated into one or more filesystems. In other embodiments this is implemented as a set of filesystem extensions such as plug-ins and/or filters.

Encryption of untrusted files and/or files with certain licensing requirements.

In some embodiments, isolated files are encrypted. From security standpoint, file encryption is a preferred method because it keeps any malware inert until a file is decrypted. This prevents a user and/or an application on the host, for example, from accidently opening an untrusted file in a trusted environment.

Alternatively or additionally, licensing requirements associated with the file may require that the file be encrypted. This can prevent users or entities that are not licensed to access the file from accessing the file.

File System Filter Driver

Because encryption of untrusted files or licensed files makes sharing such files with other systems difficult, another alternative is to keep the file unencrypted but prevent access on the host by using a file system filter driver. Access would only be allowed from an isolated guest operating system or by an operating system licensed to access the file. Some embodiments may allow untrusted files or licensed files to be accessed by known executables that have been modified to access these files securely by not processing their content (for example, some anti-malware applications, or specific operating system components such as the Windows Shell).

Embodiments illustrated herein include functionality for persisting untrusted files and/or licensed files across different execution environments. As noted above, this functionality may be used in combination with other security techniques.

One embodiment may include a secure system for persisting untrusted files and/or licensed file to the host file system. This secure system may have a number of other features.

For example, the secure system may use a combination of file system metadata/ACLs and encryption and access controls. It may additionally or alternatively track files using other identifiers and store data about the files in a separate location.

Alternatively or additionally, the secure system may be configured to process file open requests for untrusted files and/or licensed files in a secure isolated execution environment. For example, an isolated execution environment may be a container operating system, a virtual machine, an emulated runtime, or other isolated environment. Examples of isolated environments herein are sometimes referred to simply as a container or a guest. When the examples illustrated below show use of a container operating system, it should be appreciated that other types of isolated operating systems may be used, alternatively or additionally.

In some embodiments the secure system may include enhanced features to an operating system or file access mechanism, such as including targeted enlightenment of certain applications. As will be illustrated in more detail below, applications can be enlightened to identify which files are trusted or not, which files are licensed for use in a host operating system, which files are licensed for use in a guest operating system, etc. In some embodiments, this may be accomplished by the applications being able to access file metadata, such as the headers, metadata files, ACLs, etc., described above. In some embodiments, files may be tracked by the host operating system, which will then launch the appropriate container and application to enable file access. Alternatively or additionally the host operating system will provide a notification mechanism to the applications.

In some embodiments, the secure system may be configured to intercept an "open" command (or other commands, such as create, write, copy, etc.) for files. For untrusted files the user will be presented with options to abort or open the file in a secure isolated execution environment. Alternately, the file is directly opened in the secure isolated execution environment without requiring user choice. Trusted files can be opened on the host portion (i.e., a host operating system, sometimes referred to simply as a host) of the secure system. To accomplish this functionality, some embodiments of the secure system may further include an application programming interface (API) that probes the trust state of a file, such as by accessing file metadata. Alternatively or additionally, some embodiments of the secure system may further include an API such that applications and other software components can mark files untrusted (or alternatively or additionally as trusted).

With respect to file licensing, some embodiments may be configured to determine licensing requirements and/or restrictions associated with the file. For example, certain licensing requirements may require that the file be opened (or otherwise operated on) only in a host operating system. Alternatively, licensing requirements may require that the file be opened (or otherwise operated on) only in a guest operating system. Alternatively, certain licensing requirements may require that the file be opened (or otherwise operated on) in a particular type of operating system, which in some embodiments may be a subset of guest operating systems.

Some embodiments of the secure system may include functionality that automatically marks files as trusted and untrusted. In one scenario, a trust attribute may be configurable via enterprise policy and tracked as a part of file origin. For example, an enterprise user may download a document from a corporate server. This server may be identified by attributes such as location attributes (e.g. an IP address or URL), security attributes (e.g. an X.509 certificate or directory service listing such as active directory), etc.

If this server and its identity are a part of the enterprise policy, the document the user downloads from it will automatically be marked as trusted. In this same scenario, any file that originates from an untrusted source (e.g. a server, a removeable storage device, etc.) will be automatically marked as untrusted. Alternatively or additionally the file, once downloaded from a source may be examined by diagnostic software (such as anti-virus, anti-malware, etc.) and trust level may be determined as a result In some embodiments there may be multiple levels of trust. For example, if a file is from a known enterprise server and passes security inspection, it may be at the highest level of trust. If a file is from an unknown server and passes security inspection, it may have a middle level of trust. If a file fails security inspection, it may be untrusted. There are other additional or alternate mechanisms to assess a file for trust such as digital signatures, application identities, user identities, etc. In one embodiment, user A may send a file to user B. User B (or a software component on behalf of user B) does a background check via a $3^{rd}$ party service to determine the trust level before opening the file from user A.

Similarly, licensing requirements may be automatically applied to a file. For example, files from certain sources will automatically have licensing requirements applied to them. Alternatively or additionally, certain types of files will automatically have licensing restrictions associated with them. Alternatively or additionally, inspection of files can result in certain licensing requirements being applied to the files.

In some embodiments, when a trust level is applied to an archived (typically compressed) collection of one or more files, e.g., .zip files, .cab files, etc., extracting files from inside the archived collection preserves the trust level on all extracted files. Thus, for example if the archived file itself has a lower trust level, any files extracted from that archived file will have the same lower trust level automatically applied.

Similarly, when a license is applied to an archived collection of one or more files, extracting files from inside the archived collection preserves the licensing requirements on all extracted files.

Similarly, when one or more files are combined into a single archived file, the generated archived file preserves the lowest trust marking or licensing requirements of its constituent files. Some embodiments will optionally disallow creation of such an archive file with a mix of files with different levels of trust marking or different licensing requirements.

Some embodiments of the secure system may include functionality that allows toggling of the trust attribute of a file. For example, as will be illustrated in more detail below, some embodiments may include user interface elements, such as right-click context menus, or other user interface elements, that allow users to toggle a trust attribute of a file from trusted to untrusted and vice-versa.

Some embodiments of the secure system may include functionality to save untrusted files from the guest to the host without caching data in the guest. In the guest, when a user or application saves a file, one or more folders on the host operating system is available to save the file. For security or licensing reasons, the system calls to access the host filesystem may be restricted (e.g. via ACLs or other methods). These folder locations may not be accessible to a user or application on the host, or in some embodiments, the files are automatically encrypted or altered so they cannot be opened on the host.

Some embodiments of the secure system may include functionality to save untrusted and/or licensing based restricted files from the guest to the host without exposing the host file system to the guest. For example, an interprocess communication (IPC) that does not expose the host file system can be used to communicate file data from the guest to the host, where the host can manage where the file data is stored. For example, embodiments may use sockets, message queues, pipes, shared memory, message passing, etc.

Some embodiments of the secure system may include functionality to save untrusted files or licensing restricted files from the guest to the host while exposing a limited view of the host file system to the guest to improve the user experience. For example, various filter layers can be used to control which portion of the file system are exposed.

Some embodiments of the secure system may include a monitoring system which monitors file open requests made to files and determines how and where (e.g., in the host or the guest) to open these files. For example, the monitoring system may cause untrusted files to be opened in the guest while preventing such files from being opened on the host, and trusted files to be opened on the host while preventing such files from being opened on the guest. Alternatively or additionally, licensing restrictions may specify where file may be opened. For example, DRM restrictions may specify the file can only be opened in a host operating system, or alternatively only in a guest operating system, or alternatively only in an operating system having certain characteristics.

Some embodiments of the secure system may include an enforcement mechanism that blocks applications from opening trusted files in the guest and/or that blocks applications from opening untrusted files in the host. Alternatively or additionally, some embodiments of the secure system may include an enforcement mechanism that blocks applications from opening files licensed for host use in a guest operating system while allowing such files to be opened in a host operating system and that blocks applications from opening files licensed for guest use in a host operating system while allowing such files to be opened in a guest operating system.

Some embodiments may include various application packaging techniques to facilitate distribution, installation, maintenance, configuration, removal, etc. Sometimes an entire guest operating system with one or more pre-installed applications is used for packaging. In some embodiments, the trust level and/or license may apply to the entire package, including the guest operating system and files packaged with the guest operating system. In some embodiments the trust level and/or license may apply to individual contents of the package.

In the examples illustrated below, many of the examples are described in the context of various computing systems and components available from Microsoft Corporation of Redmond, Wash. However, it should be appreciated that the principles illustrated herein can be implemented on other computing systems produced and/or marketed by other vendors.

Referring now to FIG. 1A, a secure computing system 100 is illustrated. The computing system 100 includes a host operating system 102. The host operating system 102 hosts other guest operating systems such as the guest operating system 104. Note that while a single guest operating system 104 is illustrated, it should be appreciated that typically multiple guest operating systems will be implemented on the computing system 100. Indeed, much of the usefulness of guest operating systems is achieved by leveraging the sharing of resources on the computing system 100. Further, the reader is reminded that although a container operating system is discussed often herein, it should be appreciated that other types of guest operating systems may be implemented within the scope of embodiments of the present invention. In particular, embodiments are not limited to systems including container operating systems.

Trusted files 105-A and untrusted files 105-B reside on the host file system 106. File open requests for these files can originate from different sources; for example, from a file manager application, such as File Explorer available from Microsoft Corporation of Redmond, Wash., from shell commands, from an "open" command from within an application, such as one of the applications 108-4 in the host operating system 102 or 108-2 in the guest operating system 104, etc. Embodiments illustrated herein process these requests in a secure isolated execution environment (e.g., a container operating system, such as guest operating system 104). One way to achieve this is by enlightening all applications 108 to properly recognize the trust state of the files in the file system 106. Application enlightenment can achieve a more elegant and streamlined user experience. However, it should be appreciated that embodiments do not require application enlightenment with respect to trust state for files, and indeed backward compatibility considerations may necessitate specifically allowing applications not having application enlightenment with respect to trust state for files. A different way to achieve this is for a component of host operating system 102 to intercept the open command. If one of the trusted files 105-A is opened, the filesystem intercept is able to determine this and open it on one of the application 108-4 on the host operating system 102. If one of the untrusted files 105-B is opened, the filesystem intercept is able to determine this and open it on one of the applications 108-2 in the guest operating system 104.

Figure 1B:
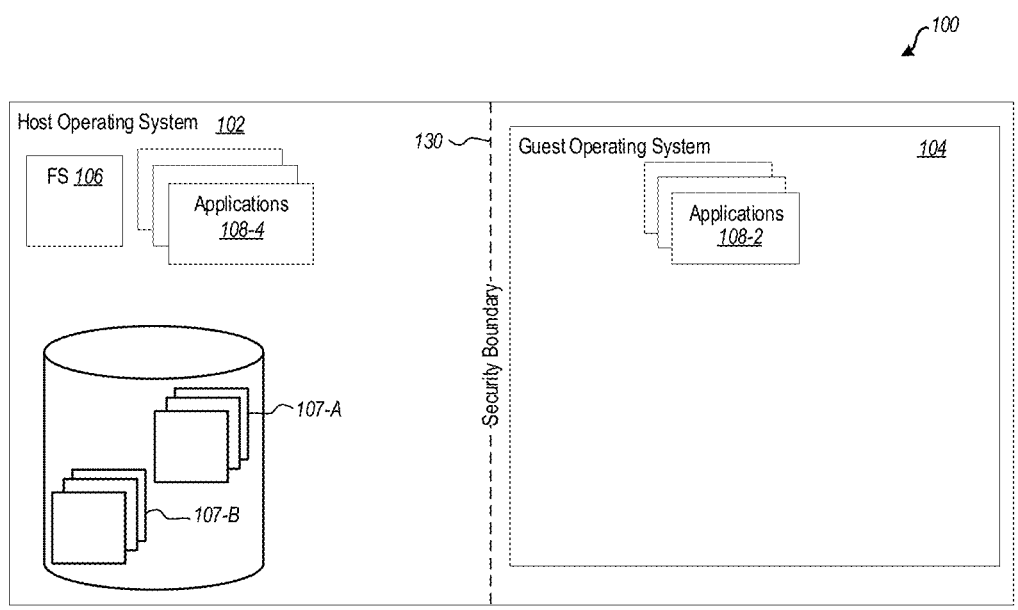
FIG. 1B illustrates a computing system having a host operating system and a guest operating system configured to operate on files in the guest operating system according to a licensing characteristic.

Referring now to FIG. 1B, embodiments may include files with different licensing requirements. For example, FIG. 1B illustrates unlicensed files 107-A and licensed files 107-B. The filesystem 106 can determine licensing requirements for the licensed files 107-B to determine whether the files can be opened on the host operating system 102, the guest operating systems 104, or both.

In one embodiment, an operating system (OS) and file manager application (such as File Explorer available from Microsoft Corporation of Redmond, Wash.) with targeted enlightenment of certain applications is implemented. Embodiments intercept the "open" command (or other file manipulation commands) and when the open target is an untrusted file the user can be presented with a user interface element, such as a dialog window that provides the option to abort or open the file in a secure isolated execution environment. Furthermore, enlightened applications will be able to signal that a file that they are creating is not trusted. One example of this is when a file is created in a secure isolated execution environment, such as the guest operating system 104, and the file is stored on the host file system 106. The application creating the file may have the ability to mark the file as untrusted. Another example is when an email client receives a file and needs to save it to the host file system 106. The email client may have the ability to mark the file as untrusted. This can be done by creating or modifying an attribute of the file.

Similarly, if the user attempts to open a licensed file in an operating system for which the file is not licensed, embodiments can present user interface elements indicating to the user that the file cannot be opened in the operating system in which the attempt to open the file was made.

No matter how trust or licensing is marked, some embodiments include an API that probes a file's trust state and/or licensing conditions and enables software components to take appropriate actions. Some embodiments automatically mark known untrusted files as such. Alternatively or additionally, the system could mark files as trusted.

In one particular embodiment, files will be considered untrusted unless they are explicitly marked trusted (although as illustrated below, there is some benefit to having the default be trusted while untrusted files are marked as such). The advantage is that unenlightened applications will be able to inject files onto the host and those files will be automatically opened in a secure isolated environment. The disadvantage is that it is required to enlighten all applications that create files, and/or implement additional heuristics which may be needed in the OS to mark files as trusted. An example of an additional heuristic is diagnostic software that runs in the host and performs an analysis of all files as they are created to determine the trust level.

Similarly, in some embodiments, files will be considered unlicensed unless they are explicitly marked with a license.

In another embodiment, in addition to making changes to the OS and file manager application to enlighten them on the correct way to handle such untrusted files, embodiments default to treating unmarked files as trusted. The advantage to this approach is that existing files on the system, placed there by legacy systems prior to deployment of the advanced features illustrated herein, can continue to get the same level of trust that the user is expecting and new content will get marked correctly based on the origin of the content (which will not be available for pre-existing files on the system). Furthermore, in this model, untrusted files will open directly in the secure isolated execution environment and any unapproved host access will be blocked with an access error. In the containerization scenario, this may mean that only those OS elements surfaced to a given container will be able access the untrusted file. Any other OS elements would be blocked from accessing the file, for example, using the aforementioned access error.

Content downloaded from an email client poses another challenge. Some embodiments may be implemented in systems that have markings of distrust that survive an email journey. Those embodiments will function with the trust or distrust markings being used to determine where files will be opened. However, generally content downloaded from an email client will need to be opened in an isolated execution environment.

Figure 2:
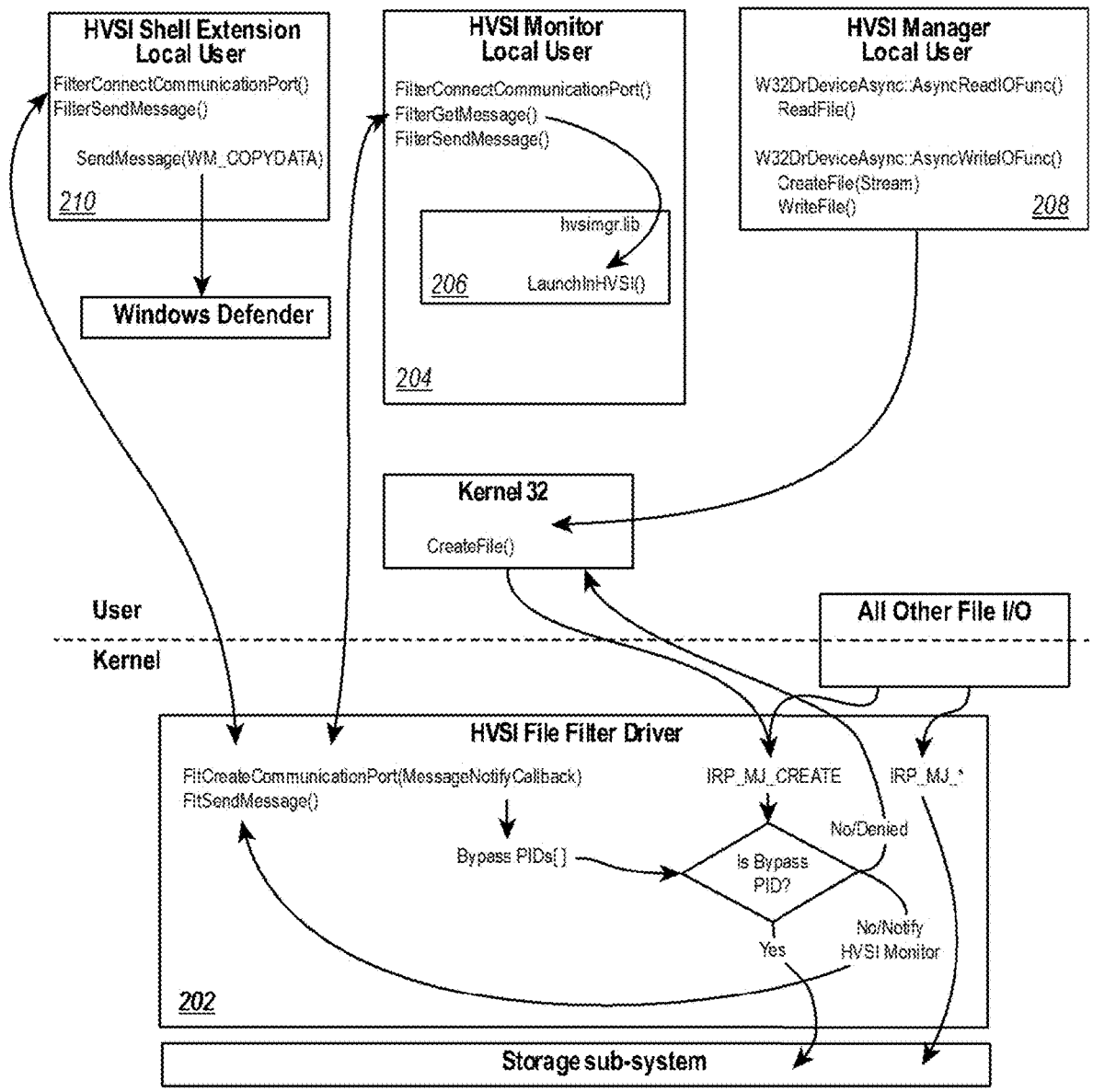
FIG. 2 illustrates interactions between various system components for causing files to be interacted with safely.

Referring now to FIG. 2, some embodiments expose one or more application programming interfaces (APIs) such that applications and other software components can specifically mark files as untrusted. Similar API's may be used to handle licensing requirements for files.

In FIG. 2, there is an executable that monitors file open requests made to untrusted files. Note that in some embodiments this functionality may be built into the file system or other operating system component. This component communicates with the file filter driver 202 to implement two types of communications:

1) receipt from the file filter driver 202 of messages that contain the pathname of untrusted files that were the target of a CreateFile( ) command; and 2) sending messages to the file filter driver 202 to tell it which process IDs should be able to bypass all I/O intercepts.

File systems and/or file system extensions enable the host operating system 102 and guest operating system 104 to efficiently share files. In some cases, operating system files are shared to lower the overall disk footprint. However not all files can be shared. In isolation scenarios, the filesystem in host operating system 102 may have additional files and/or different files than guest operating system 104. To implement this, the additional files are filtered or blocked between processes in host operating system 102 and guest operating system 104. In FIG. 2, the filtering component that implements this is illustrated as file filter driver 202.

Some embodiments have the ability to register and track trusted files. When a trusted file is operated on, the file attributes including process ID are dynamically tracked and provided to file filter driver 202. This may be implemented by HVSI monitor 204, HVSI manager 208 or another operating system component.

Note that in some embodiments, the HVSI monitor 204 has an interface that enables new components and/or applications to request unfiltered IO. When the HVSI monitor 204 gets such a request, it checks various file characteristics to determine if it is trusted. These characteristics may include the origin of the application or component, the digital signature of the application or component, etc. The HVSI monitor 204 then monitors process launch. For this list of trusted applications and components if one of them is started, the HVSI monitor 204 derives the associated process ID and gives it to the filter driver. When the process is terminated, the HVSI monitor 204 removes this process ID and provides the update to the filter driver.

For the path noted in #1 (i.e., receipt from the file filter driver 202 of messages that contain the pathname of untrusted files that were the target of a CreateFile( ) command), the threat is perceived low because the user is trusted, it is receive-only (in filter code), and abuse, such as taking control of the port, just degrades the user experience—it does not open a vulnerability. For #2 (i.e., sending messages to the file filter driver 202 to tell it which process IDs should be able to bypass all I/O intercepts), this communication poses a significant risk. Some embodiments may remove the communication in #2 and instead read process information and monitor process creation and deletion from Kernel mode using the file filter driver.

In some embodiments there is a monitoring service to ensure that files are opened in the appropriate location. This component may have additional monitoring capabilities that are beyond the scope of this specification. In FIG. 2, this is illustrated as HVSI monitor 204.

The file filter driver 202 attaches to all drives and intercepts I/O operations monitoring for request types such as CreateFile( ) and/or OpenFile( ) File create/open requests directed at untrusted files are terminated with ACCESS_DENIED during the filter driver's pre-operation callback. When a create/open request is terminated due to it being an untrusted file, the file filter driver 202 sends the target pathname and the process ID of the caller to the hardware-based virtualized security isolation (HVSI) monitor 204 via FltSendMessage( ) Note that the HVSI monitor 204 component may be implemented as an executable, a monitoring service or as a part of an operating system.

Similar functionality may be implemented to ensure that files are only opened in the operating system for which they are licensed.

In some preferred embodiments, applications are enlightened to understand the notion of trusted files and the isolated execution environment. In this approach, the host operating system 102 will provide APIs accessible by the applications to verify trust level of a file as well as an API accessible by the applications to open a file in the secure environment (e.g., the guest operating system 104). Enlightened applications can use these APIs to determine if a file is untrusted and if so, call the API to open the file in the isolated execution environment.

Similarly, embodiments may use applications that are enlightened to understand the notion of file licensing in the isolated execution environment. The host operating system 102 can provide APIs accessible by applications to verify licensing levels of a file as well as APIs accessible by the applications to launch the file in the secure environment. Enlightened applications can use these APIs to determine if a file is licensed for the particular operating system in which the application is running, and if so, the application can call the API to open the file in the application in the licensed operating system.

For unenlightened applications, upon receiving notification (e.g., via FilterGetMessage( ) in the illustrated example) of a create/open request, the HVSI monitor 204 examines the context of the open/create attempt and decides if additional action is needed. By keeping the heuristic based decision making within the HVSI monitor 204, Kernel mode complexity in the filter driver is reduced. Heuristics include ignoring calls from certain processes such as Shell, ignoring operations that occur in quick succession, etc. By "ignoring" it is meant that the user interface won't pay attention to these calls, yet the filter driver 202 does (and already had terminated the original call with ACCESS_DENIED).

If it is determined that this request is coming from the API to launch untrusted files in the isolated environment it will let the file access proceed. Otherwise, if it appears that this is a user request to open a file, the HVSI monitor 204 will produce an alert, such as a top-level system modal dialog box asking if the user would like to open the untrusted file in the HVSI container.

If the user clicks OK (or otherwise indicates that the user would like to open the untrusted file), then the HVSI monitor 204 calls LaunchInHVSI( ) 206 with the already supplied pathname that has been modified to be in tsclient format. The API LaunchInHVSI( ) 206 is not protected and can be called by anyone with the correct linkage. This means that even trusted files could be opened in the guest operating system 104. Optionally embodiments can check if the file is trusted and block it if needed from opening in the guest operating system 104. In some embodiments, the trusted files are encrypted). This may be implemented using Windows Information Protection (WIP) or some other method. In this case, embodiments can detect them and not open them in the guest operating system 104. There are two important notes here: 1) if/when that trusted file is written back by guest operating system 104, it will be definitively marked as untrusted by a trusted broker on the host operating system 102, and; 2) this API can be hardened (pursuant to limitations of user account executing from within), such as to verify that the file is untrusted.

In some embodiments there is a management service to provide a more seamless user and/or application experience between host operating system 102 and guest operating system 104. In FIG. 2, this is illustrated as HVSI Manager 208. HVSI Manager 208 has the ability to read/write untrusted files. For a seamless user experience, applications may require read/write access to untrusted files. In some embodiments, this is achieved by having the HVSI monitor 204 send (e.g., via FilterSendMessage( ) as illustrated in the example) a list of bypass process identifiers. This is not secure from two perspectives: 1) this is a user ACLed component transferring the process IDs, and; 2) the process name is the sole determinant of which process ID to bypass untrusted checks.

The HVSI manager 208 may be similar to existing container or virtual machine management software, but with some functionality added to create a special HVSI alternate file stream in each file persisted from an HVSI container operating system. When the HVSI Manager 208 receives data to be written out to a host file in the host file system 106, it writes that data by calling a data writing function such as, in the illustrated example, W32DrDeviceAsync::AsyncWriteIOFunc( ) which, in the illustrated example, is in mstscax.dll loaded into the HVSI Manager process. By modifying W32DrDeviceAsync::AsyncWriteIOFunc( ) embodiments call CreateFile( ) to create and re-create a special alternate file stream that marks files as untrusted. The untrusted stream is created prior to each and every WriteFile( ) If the untrusted stream cannot be created, W32DrDeviceAsync::AsyncWriteIOFunc( ) terminates early (WriteFile( ) is not called) with an ACCESS_DENIED error.

In some embodiments there is an operating system shell that provides a user interface. In some embodiments this is improved and/or extended to provide a more seamless user and/or application experience between host operating system 102 and guest operating system 104. In FIG. 2, this is illustrated as HVSI shell extension 210.

In one particular implemented embodiment the untrusted stream is named "949E25FE-1399-4B7C-96A8-9C5091C173BB" which is the same GUID as the HVSI Shell Extension. A GUID was selected to minimize the risk of collision with some other entity's alternate file stream. Note that other embodiments use other types of unique identifiers. In some embodiments, the stream itself is empty for the following reasons: 1) writing data into the stream does not improve security; 2) any data written/read would increase I/O operations, and; 3) any data written would increase space consumption by at least one block per untrusted file.

The HVSI file filter driver 202 intercepts I/O operations and prevents users from removing the alternate file stream that marks files as untrusted. Administrators can make files trusted by removing the alternate file stream that marks files as untrusted. As a convenience, the HVSI Shell Extension 210, in some embodiments, provides this capability with a simple context menu command and automatically sends them to be trusted file(s) to a malware scanning application such as Windows Defender available from Microsoft Corporation of Redmond, Wash. for malware scanning.

In other embodiments, embodiments use an Extended Attribute (EA) to mark the file as untrusted. This, in combination with a file system filter driver can ensure that user mode code cannot directly remove the EA. In addition, a tamper proof API is provided for enlightened applications to call in order to mark a file as trusted and this will allow the system to audit these changes to the security log.

Untrusted data is written by, in the illustrated example, W32DrDeviceAsync::AsyncWriteIOFunc( ) in plaintext form. If there is malware in the data it may not be immediately known. Untrusted data is read by W32DrDeviceAsync::AsyncReadIOFunc( ). As noted earlier, as part of converting an untrusted file to trusted, a malware scanning application can be called upon to scan the file. If malware crosses into the HVSI Manager 208 via file persistence I/O or by some other signaling or data transport and can achieve execution, the malware will be able to act with the same privileges as the local user. These functions that handle writing and reading untrusted data will be verified from a threat model and pen test perspective.

In the illustrated example using a file navigation tool, such as File Explorer available from Microsoft Corporation of Redmond, Wash., embodiments may provide two right-click context menu items (or other user interface elements) to convert files to/from trusted/untrusted files. That is, embodiments may include functionality to toggle files between trusted and untrusted. Files that have been converted to trusted are then automatically handed over to diagnostic software such as Windows Defender via SendMessage (WM_COPYDATA) for scanning. Note that Windows Defender is used in the illustrated example, but this may be could be sent to another malware detection product. In some embodiments this file may not be sent and alternatively a file pointer may be provided. If Windows Defender is not already loaded and running, the HVSI Shell extension 210 launches it first. If Windows Defender cannot be found or for some reason returns an error result, the target files will be converted back to untrusted. Note that in some embodiments, the diagnostic software may be running as a server or cloud service that is not part of host operating system 102.

Operating system file filter drivers such as file filter driver 202 can attach to all volumes and intercept any or all I/O operations before they commence and/or after they complete. The HVSI file filter driver attaches to all volumes and intercepts a subset of IRP_MJ_*commands.

The filter driver 202 uses FltCreateCommunicationPort( ) to create a communications port to send and receive user mode messages. Messages are sent to user mode with FltSendMessage( ) Messages are received from user mode via the callback that was supplied to FltCreateCommunicationPort( ).

For intercepted commands (such as IRP_MJ_CREATE), the original caller's process ID is checked against a list of bypass process IDs. If the caller's process ID is in the bypass list, the call proceeds down the stack unaltered. This is how the HVSI Manager and Outlook can read and write untrusted files. As noted there may be security ramifications to this bypass capability. However, these ramifications may be acceptable due to UX requirements.

For intercepted commands that do not originate in a special bypass caller such as the HVSI Manager, the filter driver checks for the presence of the HVSI untrusted alternate file stream via FltCreateFile( ). If the untrusted alternate file stream is present, then the command is terminated with ACCESS_DENIED in the pre-operation callback as noted earlier in the discussion of the HVSI monitor 204. Additionally, the caller's process ID and target pathname are sent to the HVSI monitor 204 via FltSendMessage( )

File Manipulations

There are three guiding principles that may be used in designing the guest and host file manipulations:

1. File operations are presented and authorized by the user.

2. Data is not cached in the guest (e.g., container operating system) before it is saved to the host (i.e., host operating system).

3. The file system of the host is not exposed to the guest.

Note that these are guiding principles and are not absolutes. For example, certain trade-offs can be made to facilitate other functionality. For example, as will be illustrated in more detail below, there may be situations where it is desirable to store data in the guest operating system 104 before saving it to the host operating system 102.

The following now illustrates a number of file manipulations that may be performed within the context of certain embodiments of the invention illustrated herein.

Host Open File

Figure 3:
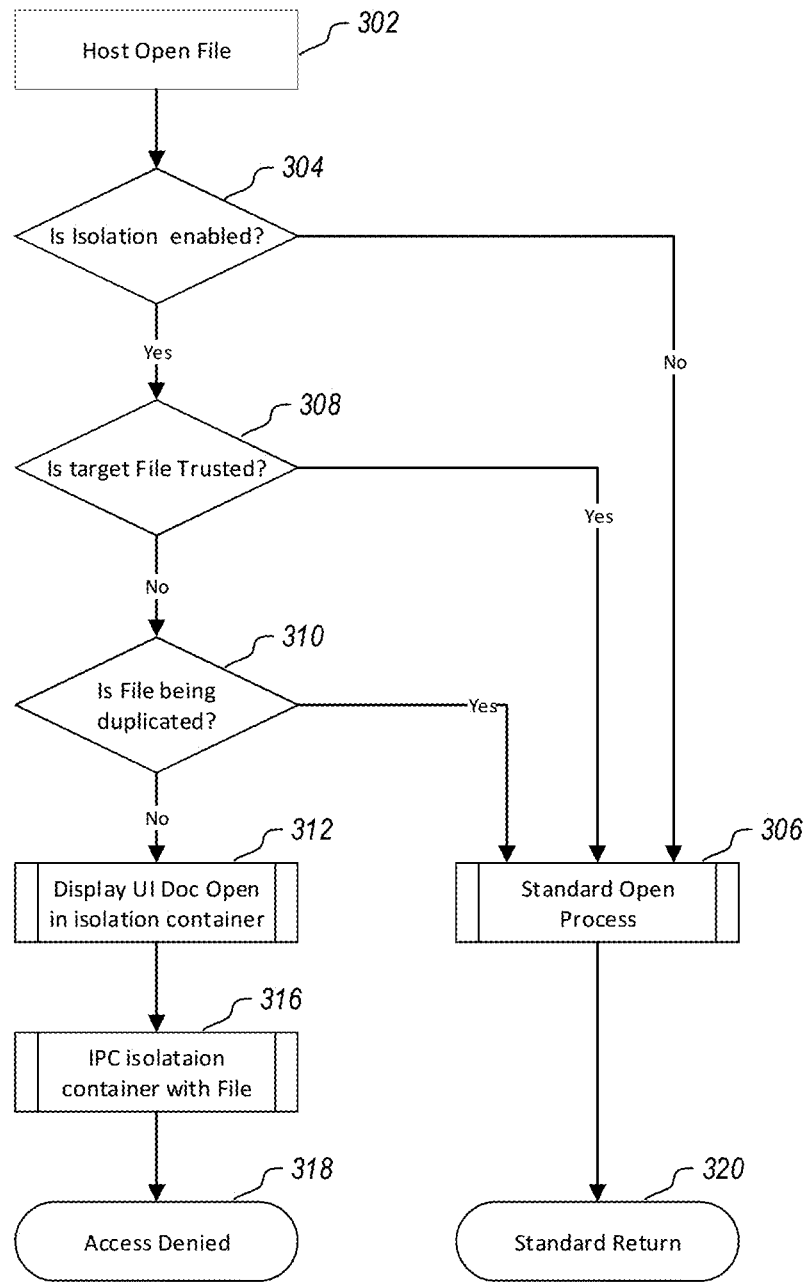
FIG. 3 illustrates a method for causing a file to be opened safely.

Referring now to FIG. 3, an example of a host operating system opening a file is illustrated. The following is in the host local user context. As illustrated at 302, the host operating system 102 receives an indication from the user that the user would like a file opened on the host operating system 102. For example, the user may indicate through a user interface, such as a dialog box, that the user wishes the file to be opened. In some embodiments this may be based on the user using the interface directly in the host operating system 102 or may be based on the host operating system 102 streaming the user interface to the guest operating system 104 where the user interacts with the user interface. The file can be opened for other scenarios to show the metadata of the file to the UI, such as type of file, content of the file etc. For the enlightened apps and system apps, like File Explorer, based on the calling application or the action for which the file is being opened, embodiments can either allow or deny the action based on the if the action is secure (like reading the file extension) or insecure (like needing parsing of the untrusted file itself) Other embodiments may use a command shell to indicate that a file should be opened.

As illustrated at 304, a check is made to determine if isolation is enabled on the computing system 100. For example, a check may be made to determine if WDAG in Windows is running on the computing system 100 or if some other container isolation mechanism is running on the computing system 100. If isolation is not enabled, then the host operating system 102 will simply open the file at the host operating system 102 as illustrated at 306 and perform a standard return 320. This could be an open process that exists in current legacy devices.

If isolation is enabled on the computing system 100, then a further check 308 is performed to determine if the target file is trusted. If the target file is trusted, then the file is opened using the standard open process as illustrated at 306. In some embodiments the check performed at 308 may check multiple trust levels and/or trust criteria to determine if the target file is trusted.

If the file is simply being duplicated, then the standard open process 306 can be performed (which in this case is simply a duplication process which does not require the computing system 100 to interpret the contents of the file in any way but simply copy the bits over as they are). In addition to copying the bits of the file embodiments also maintain any of the metadata, file attributes, MOTW, ACLs, and any other EAs.

Figure 4:
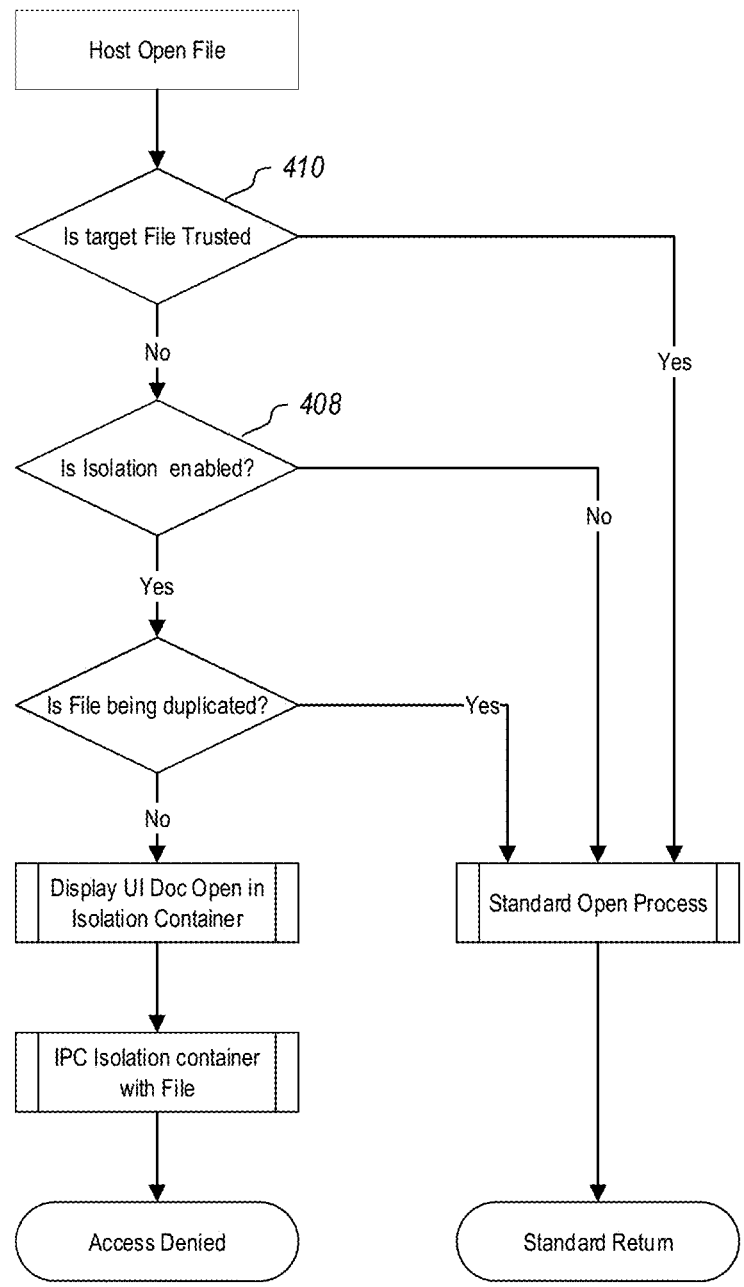
FIG. 4 illustrates another method for causing a file to be opened safely.

If isolation is enabled, the target file is trusted, and the file is not being duplicated, then as illustrated at 312 an API optionally displays a user interface element which prompts the user to indicate whether or not they would like the file opened in an isolation container, such as the guest operating system 104. Note that while in the example illustrated checks are made to determine if isolation is enabled, if the target file is trusted, and if the target file is being duplicated, it should be appreciated in other embodiments that other sets of checks can be made and that different orderings of the checks can be performed than what is illustrated in FIG. 3. Thus, the example illustrated in FIG. 3 should not be interpreted as being definitive of how all embodiments of the invention are implemented indeed, FIG. 4 illustrates an alternative example that will be discussed in more detail below. Nonetheless, it should be appreciated that the checks illustrated in FIG. 3 may not be needed for certain systems, and different checks may be needed for other systems. For example, in a system that is only able to function with isolation enabled, there is no need to determine if isolation has been enabled. This can be assumed to be the case. In another example, some systems may not allow duplication (or other file manipulations). In these systems, there may be no need to determine if a file is being duplicated.

Returning once again to the example illustrated in FIG. 3, in the illustrated example, a user can indicate that the file should be opened in the guest operating system 104. This causes the file to be opened in the guest operating system 104 IPC to be used to communicate the contents of the file, as illustrated at 316. Additionally, as illustrated at 318, access to the file is denied to the host operating system 102.

In some embodiments, one of the applications 108-1 and/or applications 108-2 will create a new file. Some embodiments will use one or more attributes to determine the trust level of the new file, for example, the trust level of the guest, the trust level of the application, the user identity, etc. In some embodiments, this new file will be created for a less secure operating system. In this case, the trust level of the new file may be determined by the attributes in the destination (e.g. the trust level of the destination guest, the trust level of the receiving user identity, etc.).

In some embodiments, a file is being accessed that has a higher or lower trust level than the operating system or application would permit. This may occur in embodiments that allow access to files of varying levels of trust. This may occur due to one of the applications 108-1 or applications 108-2 accessing a file and receiving a policy update that changed the trust level before that file was written or copied. When this occurs, file operations (e.g. write, copy, etc.) are updated to reflect the current attributes (e.g. the trust level of the guest, the trust level of the application, the user identity, etc.).

In some embodiments, the filesystem will support an undelete operation. Some filesystems will track and re-mark all undeleted files with their previous attributes and trust levels. Some filesystems will re-mark undeleted files with new attributes and trust levels based on results from diagnostic software, or other analysis.

FIG. 4 illustrates an alternative example which demonstrates that the order of checks can be implemented differently in different embodiments. In particular, FIG. 4 illustrates that in some embodiments, a check can be made to determine if the target file is trusted as illustrated at 410 prior to determining if isolation is enabled as illustrated at 408. In particular, if it is known that a target file is trusted, there may be no need to even determine if isolation has been enabled, as isolation would not be needed.

Guest Open File

Figure 5:
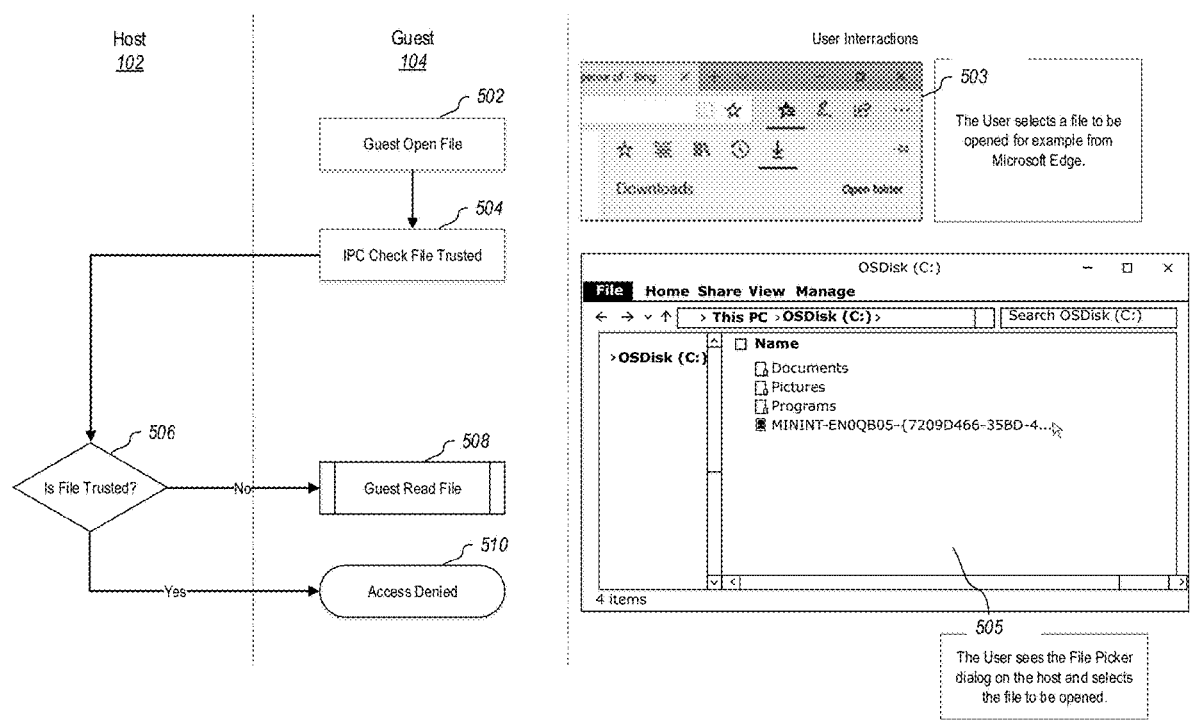
FIG. 5 illustrates another method for causing a file to be opened safely.

The following now illustrates details regarding another file manipulation, namely, the guest operating system opening a file. FIG. 5 illustrates at 502 that the guest operating system 104 receives an indication that a file should be opened. For example, this may occur as a result of the user selecting a file to be opened such as is illustrated in the user interface element 503. While this example uses the Microsoft Edge browser as an example, it could be any application or utility for opening files. As illustrated at 504, an IPC call is used to initiate a check from the guest operating system 104 to the host operating system 102 to determine if the file is trusted. As illustrated at 506 the host operating system 102 performs a check to determine if the file is trusted. If the file is not trusted, the guest operating system 104 will read the file as illustrated at 508. If the file is trusted, then as illustrated at 510, access is denied to the guest operating system 104. In particular, access is denied, as the host operating system 102 is able to open the file safely.

When the guest operating system opens a file, the host operating system will verify that the file is untrusted else it will return Access Denied. This logic is used because, in some embodiments, only untrusted files should be opened in the guest operating system. The example illustrated is in the host local user context.

Note that FIG. 5 further illustrates a user interface 505. In this example, the user sees the file picker user interface 505 dialogue on the host operating system 102 and selects the file to be opened. However, note that in other embodiments, the host may stream information about the file stored on the host operating system 102 to the guest operating system 104 where the user can select the file to open. In this context, it should be noted that although the file appears in the file system 106 of the host operating system 102, the file is not necessarily stored directly on the host operating system 102. In particular, the file may be stored on a network store, an SMB share, or in another appropriate location.

Guest Read File

Figure 6:
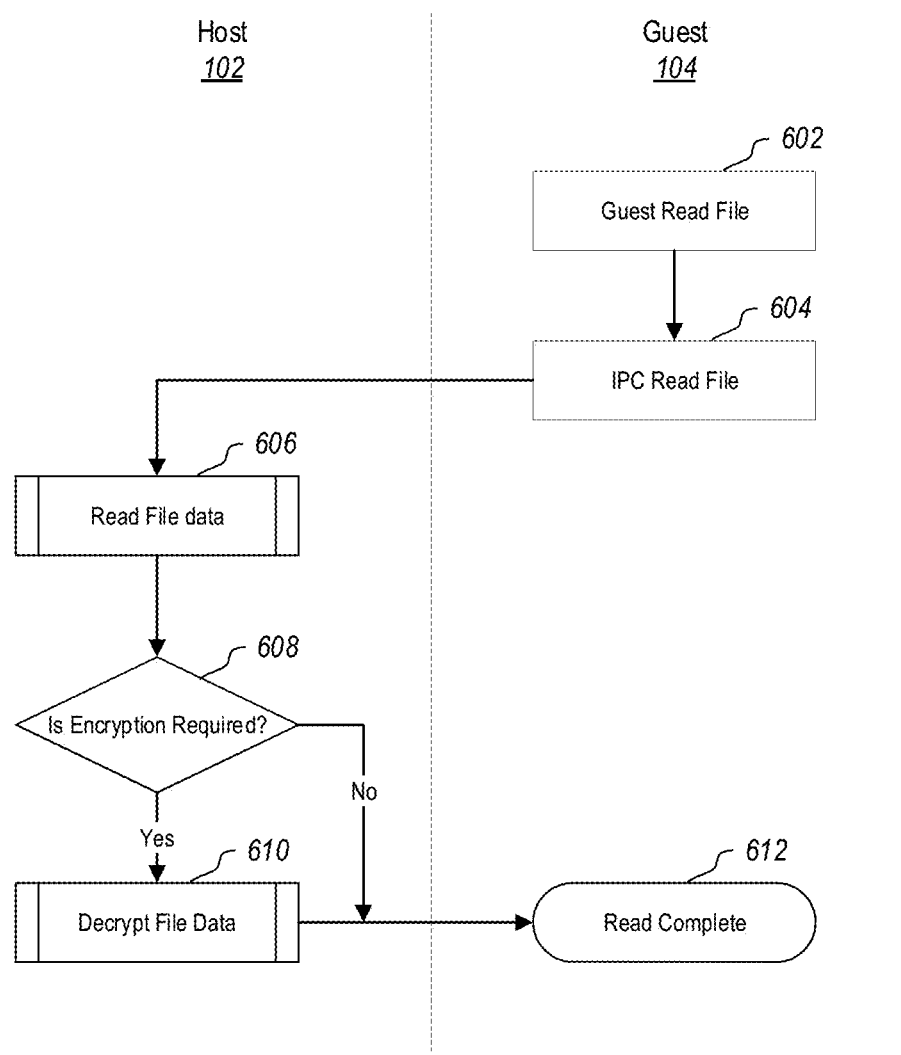
FIG. 6 illustrates a method for causing a file to be read safely.

Referring now to FIG. 6, a file manipulation where a Read starts in the guest operating system 104 context and transitions to the host operating system 102 and back is illustrated. As illustrated at 602, an indication is received at the guest operating system 104 that a file should be read by the guest operating system 104. The guest operating system uses an IPC call to request that the host operating system 102 read the file as illustrated at 604. As illustrated at 606, the host operating system 102 begins a process of reading the file data. At 608, the host operating system 102 performs a check to determine if encryption is required for the file. For example, as discussed above, some systems may include encryption as a protective measure preventing malicious files from infecting or affecting computing systems. However, encryption may be required for any one of a number of other different reasons. The example illustrated herein allows a guest to read an encrypted file when the guest does not have the appropriate keys or other authorization to decrypt the file. As illustrated at 610, if encryption is required, then the host operating system 102 will decrypt the file data and pass this information back to the guest operating system 104 which will complete the read of the file data as illustrated at 612. Note that some embodiments may use alternative or additional functionality beyond encryption such as file compression, file de-duplication, data conversion, etc.

Guest Write File

Figure 7:
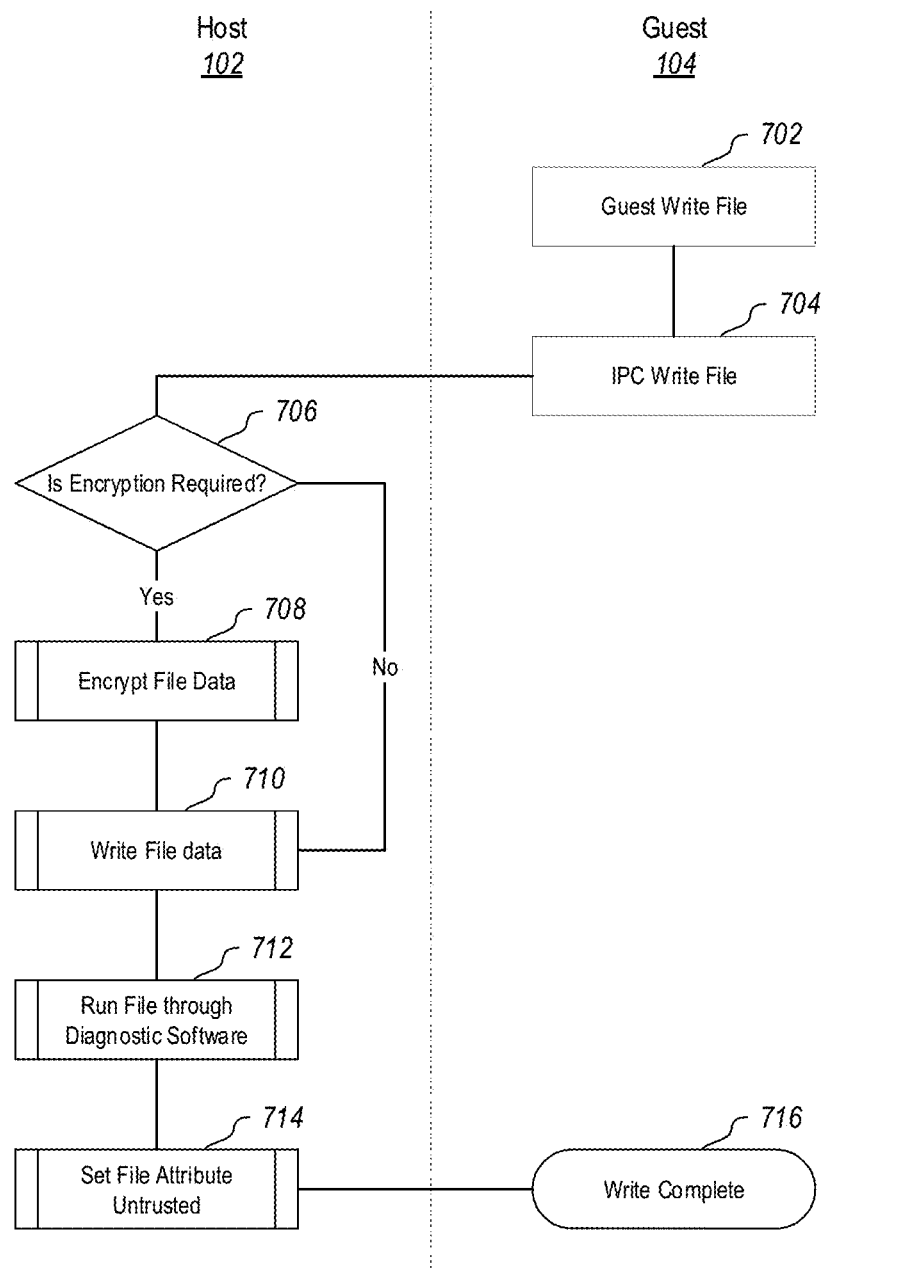
FIG. 7 illustrates a method for causing a file to be written safely.

Referring now to FIG. 7, an example of a file manipulation where a Write starts in the guest operating system context and transitions to the host operating system and back is illustrated. In this example the guest operating system 104 receives an indication as indicated 702 that the guest operating system 104 should write a file. As illustrated at 704, the guest operating system 104 makes an IPC call to the host operating system 102 indicating that the file should be written. In the example illustrated in FIG. 7, encryption may be available for the host operating system 102. Thus, in this particular example, a check is made at illustrated at 706 see if encryption is required for the file. This encryption may be required due to security reasons to prevent the file from performing malicious actions on a computing system or for other purposes. If encryption is required, then as illustrated at 708 the host operating system 102 encrypts the file data and then writes the file data as illustrated at 710. Note that some embodiments may use alternative or additional functionality beyond encryption such as file compression, file de-duplication, data conversion, etc. At 712 the host operating system 102 runs the file through diagnostic software. Running the written file through diagnostic software may include one or more of a number of different actions. For example, in some embodiments, the file system could cause the file to be checked by an anti-malware checker to determine whether or not the file data includes malware. Alternatively or additionally diagnostic software may be configured to determine if the file meets the appropriate trust characteristics (e.g. the file is appropriately signed, the file meets a certain set of patterns, the resource the file originated from is authentic, etc.). Alternatively or additionally diagnostic software may be configured to determine whether or not the hash of the file is known in a malicious hash list maintained by antivirus and file reputations sites. In an Enterprise environment, this function can be implemented with a set of trusted tools configured by the Enterprise administrator.

FIG. 7 further illustrates that a file attribute indicating the file is untrusted is set for the file as illustrated at 714. This may be performed as a result of the file write operation having begun at the guest operating system 104. Thus, in some embodiments, any write operation initiated by the guest operating system 104 may cause files written to during those operations to be marked as untrusted. However, it should be appreciated that in other embodiments, diagnostic software and or corrective software may be able to perform operations on the file such that it can be determined that the file should be trusted which would allow the file to be opened on the host operating system 102. Thus in alternative examples not illustrated in FIG. 7, certain actions can be performed to ensure that the file is trustworthy or to cause file to have changes made to make the file trustworthy such that it can have an attribute of trusted applied to it. As illustrated at 716 the write processes completes and a return is made to the guest operating system 104.

Figure 8:
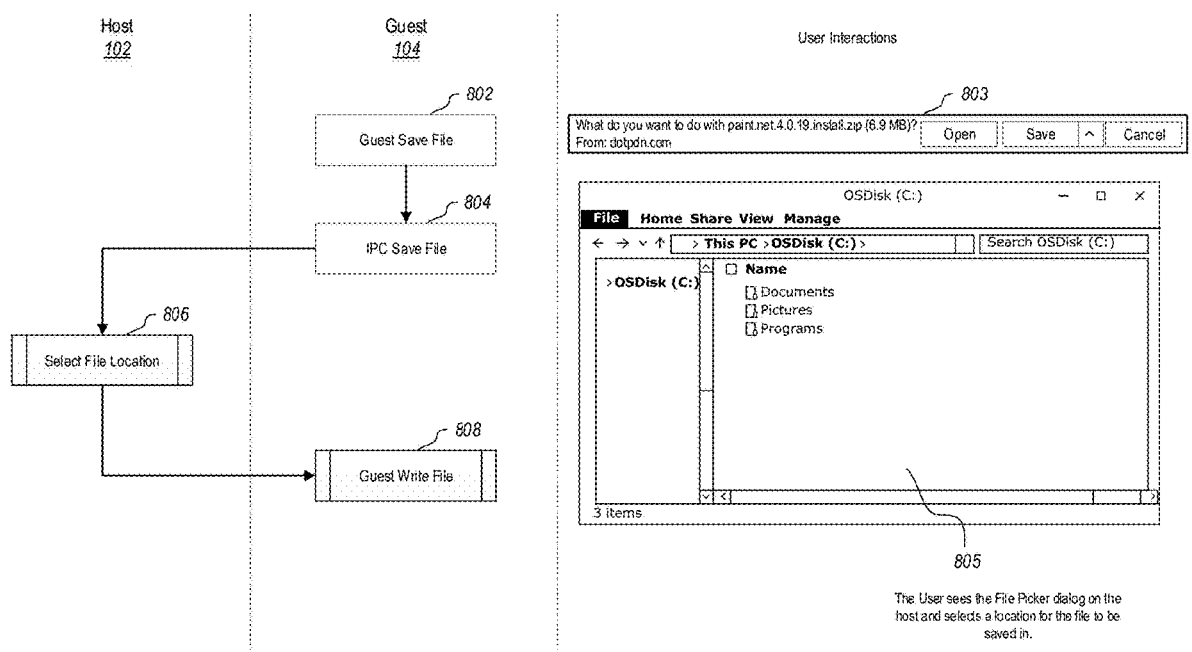
FIG. 8 illustrates a method for causing a file to be saved safely.

In some embodiments, the guest operating system 104 may be able to directly save a file to the host operating system 102. An example of this is illustrated in FIG. 8. FIG. 8 illustrates that an indication is made at the guest operating system 104 to save a file as illustrated at 802. The guest operating system 104 sends an IPC call as illustrated at 804 indicating that a file is to be saved. Using an API at the host operating system 102 the user is able to select a file location as illustrated at 806 where the file should be saved. In particular attention is directed to user interface element in 803, which might be shown to a user as the user interacts with an application, such as a browser where there is a desire to save a file from browser (where the browser is running in the guest operating system 104 as one of the applications 108). In the user interface 805 the user uses a file picker dialog to select a location on the host operating system 102 where the file will be saved. As illustrated in FIG. 8, the guest operating system 104 then uses an API to directly write the file as illustrated at 808. In this case the file would be marked as untrusted as the host operating system 102 has no way of verifying the trust status of the file.

Figure 9:
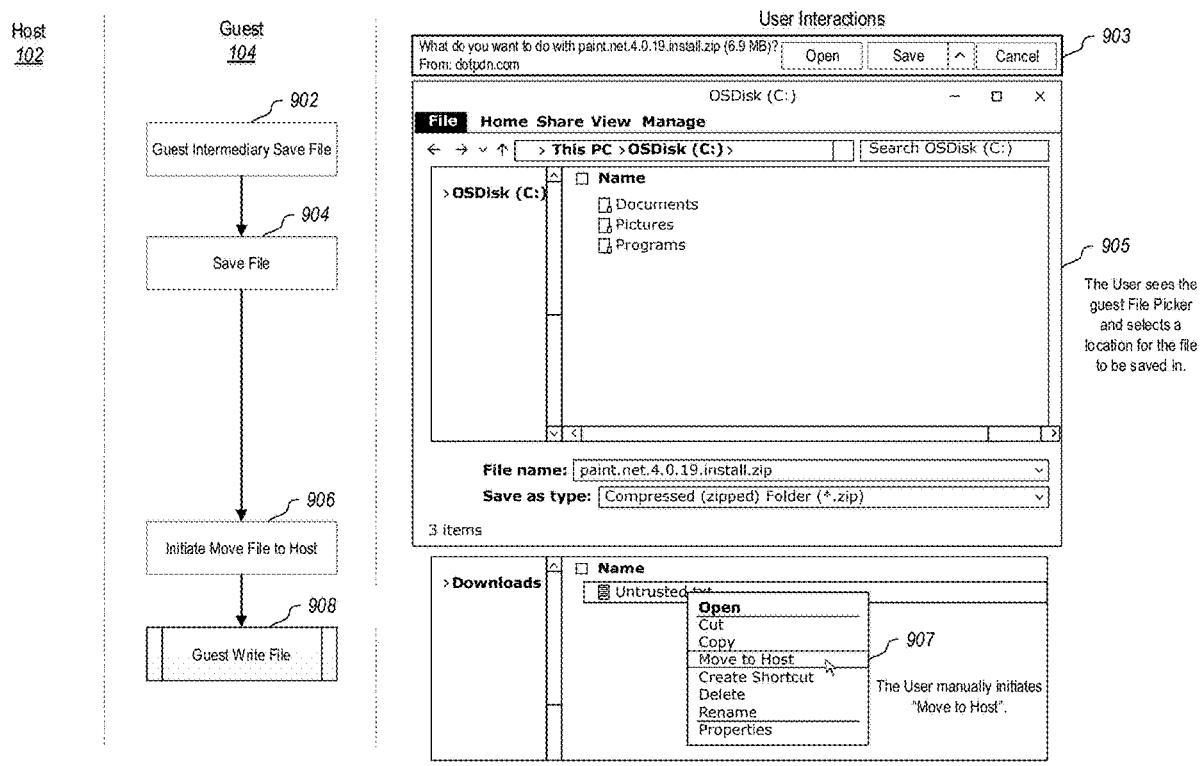
FIG. 9 illustrates another method for causing a file to be saved safely.

An alternative example is illustrated in FIG. 9 where a guest operating system 104 saves the file on the guest operating system 104 (or at least in a file system for the guest operating system 104) and initiates a move of the saved file to file system 106 of the host operating system 102. Notably, this may be less desirable in some embodiments as it creates an opportunity for an infected guest operating system to infect files that will then be stored on the host operating system. Nonetheless, some embodiments may allow for this functionality to be performed. In the example illustrated in FIG. 9, the guest operating system receives an indication that a file should be saved as illustrated at 902. For example, as illustrated in the user interface elements 903, a user may be presented with a dialog box where the user can indicate a desire to save the file. As illustrated at 904 the guest operating system 904 saves the file to the guest operating system 104. As illustrated at 905, a file picker user interface element can be used to select a location on the guest operating system 104 where the file should be saved. The user can then manually initiate a move operation to move the file from the guest operating system 104 to the host operating system 102 as illustrated at 906. As illustrated by the user interface elements 907, a user can manually initiate a move operation of a file to the host operating system 102. The guest operating system 104 uses an API to write the file to the host operating system 102 as illustrated at 908.

Figure 10:
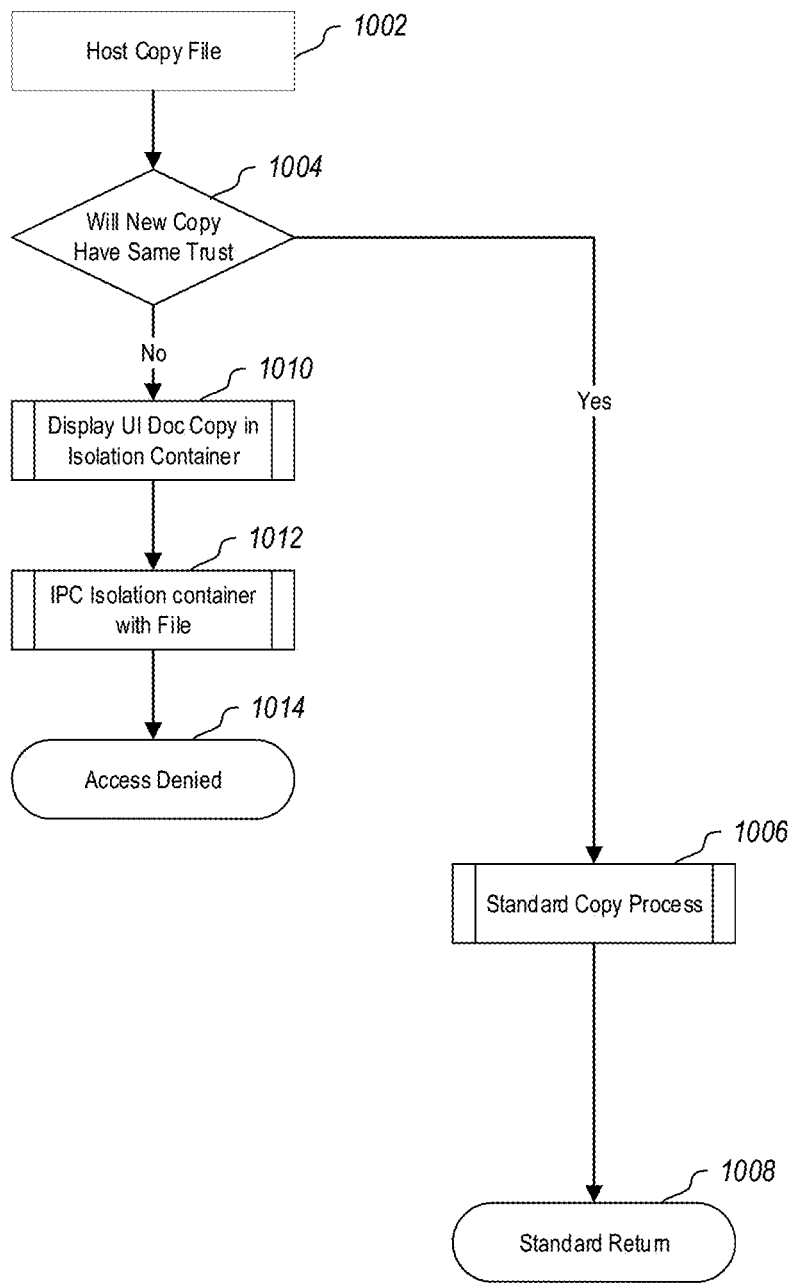
FIG. 10 illustrates a method for causing a file to be copied safely.

FIG. 10 illustrates an example of during interception of a file access, automatically allows a file-copy request based on a determination that the file-copy request will result in the new copy of the file having the same trust status as the original file. In particular, FIG. 10 illustrates at 1002 that a host operating system 102 receives a request to copy a file. At 1004 a determination is made as to whether or not the new copy of the file will have the same trust level as the file to be copied. If the new copy of the file will have the same trust level as the copy file to be copied, then as illustrated at 1006 a standard copy process is performed at the host operating system 102. As illustrated at 1008 a standard return is performed. If the new copy of the file will not have the same trust as the file to be copied, then as illustrated at 1010 embodiments may display a user interface element in an isolation guest, such as the guest operating system 104 which allows the user to indicate that the file should be copied in the isolation container. Additionally an IPC call will be made to the isolation container with the file for the isolation container to copy the file as an un-trusted file, as illustrated at 1012. As illustrated at 1014 access is denied to the host operating system 102.

In a different embodiment, the request to create a copy of the file is initiated on the trusted host operating system 102. In this trusted environment, the user can be safely prompted to make a decision whether to overwrite the file with a file with a different trust marking and the user's decision can be safely accepted. The user may also choose to assign the file a different name in order to avoid overwriting it.

Figure 11:
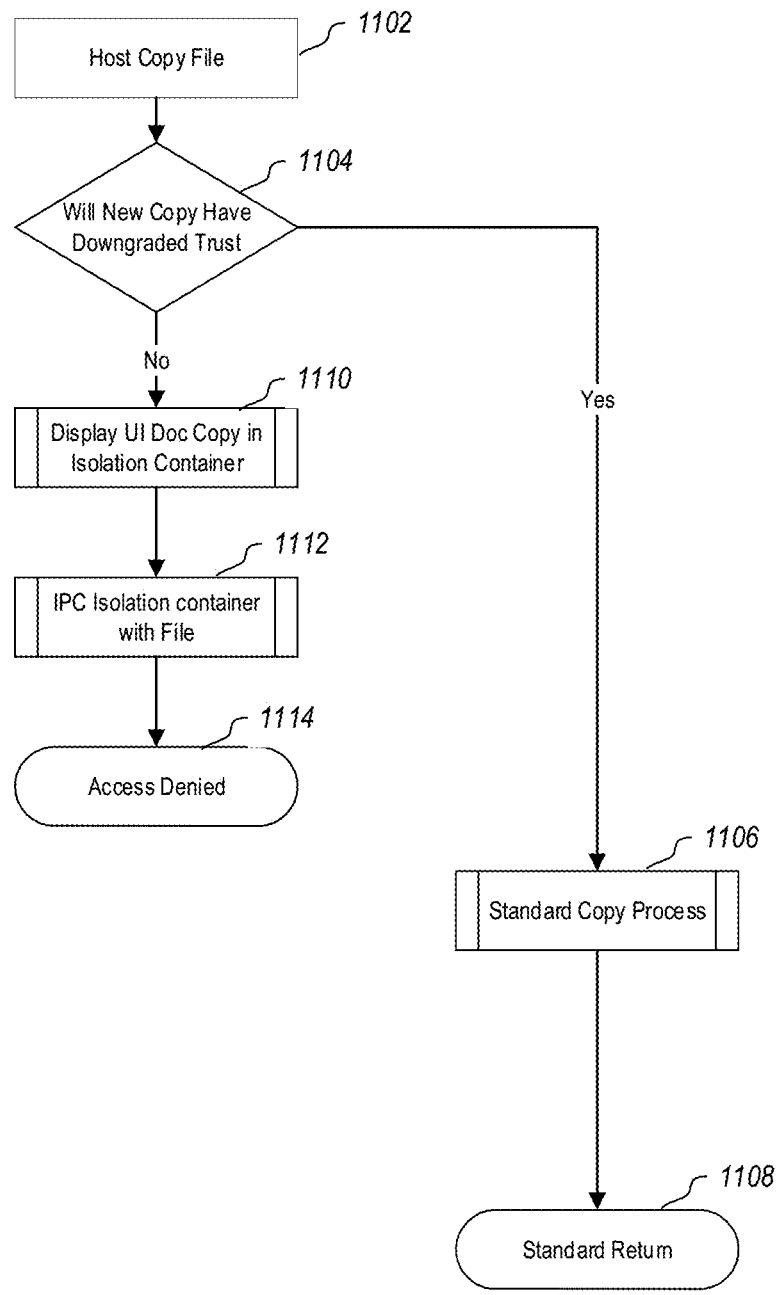
FIG. 11 illustrates another method for causing a file to be copied safely.

FIG. 11 illustrates an example of during interception of a file access, automatically allows a file-copy request based on a determination that the file-copy request will result in the new copy of the file having a downgraded trust status compared to the original file. In particular, FIG. 11 illustrates at 1102 that a host operating system 102 receives a request to copy a file. At 1104 a determination is made as to whether or not the new copy of the file will have a lower trust level than the file to be copied. If the new copy of the file will have a lower trust level than the copy file to be copied, then as illustrated at 1106 a standard copy process is performed at the host operating system 102. As illustrated at 1108 a standard return is performed. If the new copy of the file will not have a lower trust level than the file to be copied, then as illustrated at 1110 embodiments may display a user interface element in an isolation container, such as the guest operating system 104 which allows the user to indicate that the file should be copied in the isolation container. Additionally an IPC call will be made to the isolation container with the file for the isolation container to copy the file as an un-trusted file, as illustrated at 1112. As illustrated at 1114 access is denied to the host operating system 102.

Figure 12:
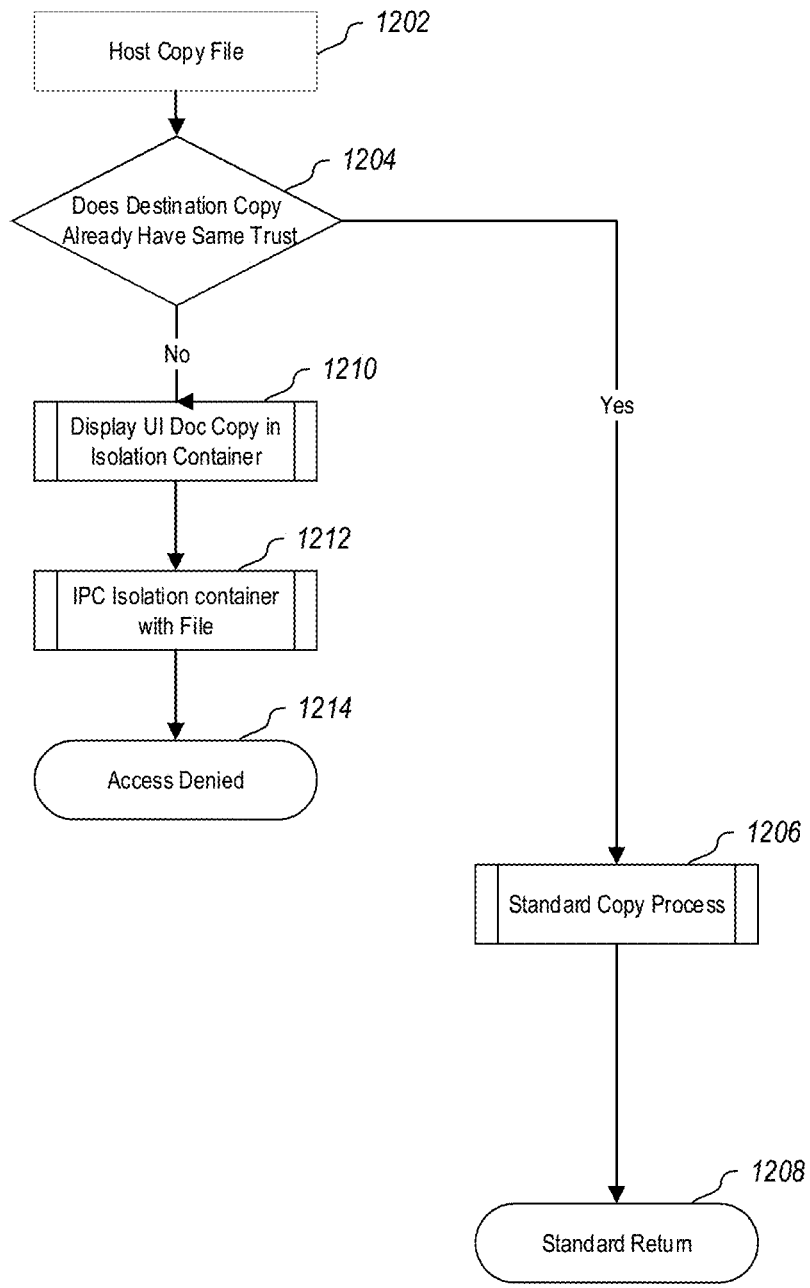

FIG. 12 illustrates an example of during interception of a file access, automatically allows a file-copy request based on a determination that destination file already has a same trust status as the original file. In particular, FIG. 12 illustrates at 1202 that a host operating system 102 receives a request to copy a file. At 1204 a determination is made as to whether or not the new copy of the file already has the same trust level (or in some embodiments, a lower level) as the file to be copied. If the new copy of the file already has the same trust level as (or a lower level than) the copy file to be copied, then as illustrated at 1206 a standard copy process is performed at the host operating system 102. As illustrated at 1208 a standard return is performed. If the new copy of the file does not have the same trust level as (or a lower trust level than) the file to be copied, then as illustrated at 1210 embodiments may display a user interface element in an isolation container, such as the guest operating system 104 which allows the user to indicate that the file should be copied in the isolation container. Additionally an IPC call will be made to the isolation container with the file for the isolation container to copy the file as an un-trusted file, as illustrated at 1212. As illustrated at 1214 access is denied to the host operating system 102.

In another embodiment, during interception of a file access from an untrusted process that would modify file data, the embodiment ensures the file is marked as untrusted prior to allowing the modification of the file data.

In the examples illustrated in FIGS. 3-12, trust levels and threshold are illustrated. However, it should be appreciated that the same or similar concepts could be applied to licensing levels and/or licensing restrictions.

Some embodiments support, or at least take into account, transportability of trusted, un-trusted, licensed and/or unlicensed files across systems using various storage media. For example, such files may be transported via USB connectable drives, or other removable and transportable media. When a less trusted or license restricted file is being transported to another device for consumption on another host secure computing system, a copy operation to the removable and transportable media preserves the lower trust marking or licensing marking of its files. When the removable and transportable media is connected to the host secure computing system, the markings will be available to the hosts secure computing system.

Alternatively or additionally in some embodiments, files from removable and transportable media may be prohibited on certain host secure computing systems. In particular, the host secure computing system may disallow files from external media that are subsequently connected to the host secure computing system from being copied to other media on the host secure computing system. In some embodiments, this can be controlled by enforcing predetermined policies indicating that files from removable and transportable media are not to be copied onto the host secure computing system. In some embodiments, files are centrally tracked and policy may enforce or allow specific file operations based on the identity of the file that resides on external media.

In the examples above, embodiments included a secure host, and a virtual machine or container as the isolated runtime. As noted above, embodiments could invert this by having a secure container implemented on an insecure host.

Alternatively or additionally, in a more complex system, embodiments could implement multi-tiered or spectral isolation. For example, files could have degrees, tiers, or other variable levels of trust or licensing rather than simply a binary trust or licensing applied. The trust, for example, could continuously or by tiers range from 'fully trusted' to 'dangerous' or 'malicious'. In one example embodiment, this variable trust could be done by taking into account file origin (e.g. what internet resource or "server" these files came from), what application created them, what environment created them, etc.

In some embodiments, this variable trust can be implemented with the same apps installed in a given guest. Different guests can be used to handle files of varying risk levels. In some embodiments, system resources are conserved by activating a guest (e.g. via pause/resume or boot) based on the trust characteristic of the file the user is trying to access and the associated app that must process it.

Some embodiments may be implemented with per-app isolation. For example, the isolated environments have one app only, but overall would function in the same manner as described above. Some embodiments include controls to tightly manage cross-app information sharing such as clipboard (copy/paste), and other cross-app information sharing.

Some embodiments may be used to implement content isolation. A user may trust one set of content (e.g. their personal files) (or be licensed for content) differently from their enterprise content. These "islands of content" can be isolated from each other using the principles illustrated above.

Some embodiments may be used to implement cross-tenant content isolation. For example, an enterprise may implement a server/service topology to isolate content between various employees (e.g. security groups) or departments.

Figure 13:
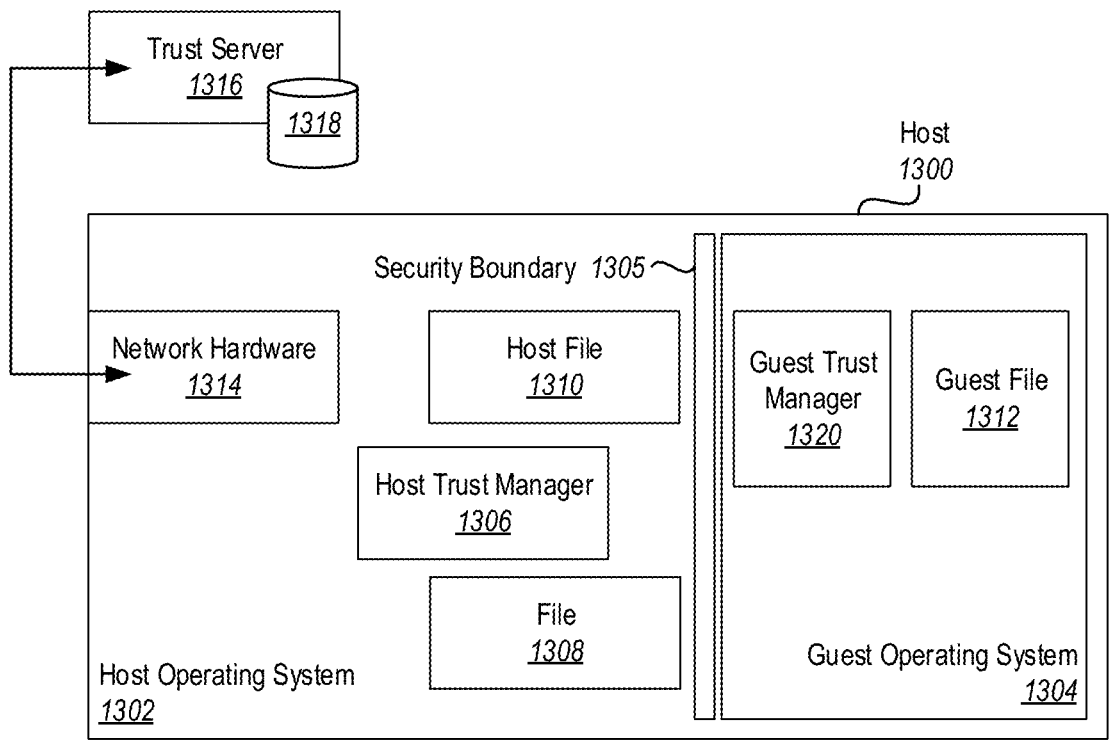
FIG. 13 illustrates a computing system having a host operating system and a guest operating system configured to perform operations on files based on trust factors.

Referring now to FIG. 13, another example is illustrated. FIG. 13 illustrates the host 1300. The host 1300 may be a computing system with various hardware and software resources. For example, the host 1300 may include various processors, memory, mass storage, networking hardware, video output hardware, displays, programmatic code, data stored in memory and/or the mass storage, or other computing resources. The host includes a host operating system 1302 and a guest operating system 1304. It should be noted (although not specifically shown), that typically a host 1300 will include several different guest operating systems, inasmuch as efficiency can be obtained by sharing the hardware and software resources of the host 1300 with multiple guest operating systems.

Applications installed in the host operating system 1302 may have access to a greater portion of the resources available at the host 1300. Indeed, some applications installed on the host operating system 1302 may have virtually unlimited access to resources of the host 1300.

In contrast, applications installed in the guest operating system 1304 will have much more limited access to the various resources of the computing system 1300. This may be enforced by various boundaries which cordon off resources, such as various security boundaries, applied to the guest operating system 1304. For example, FIG. 13 illustrates a security boundary 1305. Corresponding security boundaries are shown at 1405 and 1505 in FIGS. 14 and 15. Additionally, a security boundary is shown in FIGS. 1A and 1B at 130. The security boundaries may include functionality for preventing unauthorized communications between the guest operating systems and the host operating systems.

Some embodiments may be configured to perform operations on a file in either the host operating system 1302 or the guest operating system 1304 based on trust characteristics and/or licensing characteristics. In the example illustrated in FIG. 13, performing operations on a file in an operating system is determined by trust characteristics. Additional examples will be illustrated herein where selecting an operating system on which to perform operations on a file is determined based on licensing characteristics. Further, examples will be illustrated where selecting an operating system on which to perform operations on a file is determined by both trust characteristics and licensing characteristics.

FIG. 13 illustrates a host trust manager 1306. The host trust manager 1306 can determine if a file has sufficient trust to be operated on on the host operating system 1302. In particular, the host trust manager 1306 can evaluate a file 1308 to determine various trust characteristics of the file 1308. There are a nearly unlimited number of trust characteristics that the host trust manager 1306 can examine.

For example, the host trust manager 1306 can examine file marking, tagging, Access Control Lists (ACLs), and the like for the file 1306. File System flags, tags, ACLs, and the like can be used to persist a level of trust for the file 1308. As will be illustrated in more detail below, this marking can be used to determine where a file can be operated on. This may be performed by having, and evaluating, metadata in a header of a file 1308, an accompanying metadata file for a file 1308, an entry in an ACL, or by other appropriate means. Note that in some embodiments, a file may be stored in the host operating system 1302 but due to certain trust characteristics, only be opened or copied in the guest operating system 1304.

Note that some embodiments may have different and/or additional methods for persisting a file's level of trust. In one embodiment, a database or ledger tracks a file and stores the metadata in a cache on the host operating system. In another embodiment, this is tracked by a management service that may reside on the host operating system or on a remote computer that monitors the host operating system. Files may be uniquely identified by a set of known characteristics including, but not limited to, file name, folder name, version, size, checksum, location on disk, disk hardware unique identifiers, user identity who created/last modified the file, provider of the file, server or resource from which the file originated, user modifiable settings, etc. The location (database, ledger, management service, etc.) that stores a file's level of trust then monitors (and enforces) operations on one or more host operating systems. In some embodiments this is tightly integrated into one or more filesystems. In other embodiments this is implemented as a set of filesystem extensions such as plug-ins and/or filters.

Encryption can be a factor used in evaluating trust characteristics of a file for determining where the file will be operated on. For example, a file that is encrypted to a particular key may be trusted as it is known that the encryption key is maintained by a trusted entity. Thus, in one example file encrypted with the particular encryption key would have a trust factor that allows the file to be operated on on the host operating system 1302.

In some embodiments, trust characteristics may be determined by examining an external evaluation of the file 1308. For example, an anti-malware application can be configured to examine a file to determine if the file includes characteristics that would indicate that the file 1308 is malware. If the anti-malware application determines that file 1308 includes features that indicate that the file 1308 is malware, then the file would not meet trust characteristics necessary to perform operations on the file in the host operating system 1302. In other scenarios, external databases including information about files may be consulted where those external databases include information for evaluating a file's trust characteristics. For example, a database may store lists of trustworthy files and/or known untrustworthy files.

In some embodiments, trust characteristics may be determined based on information about from where a file is obtained. For example, if the file 1308 is downloaded from the Internet (or from particular locations on the Internet), then a trust characteristic associated with the file may not meet the threshold to allow the file to be operated on on the host operating system 1302.

In some embodiments, trust may be determined by multiple trust servers working in concert. These trust servers may reach consensus through a number of techniques such as using a quorum-based technique, an atomic commitment protocol, etc. The trust servers may use a processing method such as blockchain, in which the trust decision is managed as a transaction. Metadata about the trust determination may be stored in a ledger or other relevant data structures.

While not illustrated here, other factors may be used to determine if a file is trusted such that the file can be operated on in the host operating system 1302.

Returning once again to the example in FIG. 13, if a file 1308 is determined to have sufficient trust characteristics to be operated on in the host operating system 1302 as host file 1310, the host trust manager 1306 can allow the file 1310 to be operated on in the host operating system 1302.

If a determination is made that the file does not meet trust characteristic thresholds, then the file will be (potentially) operated on in the guest operating system 1304 as guest file 1312. It should be noted, that in some embodiments when the file does not meet trust characteristic thresholds, the file may be nonetheless stored on the host operating system 1302, but will only be opened or copied on the guest operating system 1304. However, this is merely one illustrative example. It should be appreciated that in other embodiments, a file not meeting trust characteristic thresholds will be limited to be operated on on the guest operating system 1304.

Note that in some embodiments, the host 1300 may include network hardware 1314 which allows the host 1300 to contact external entities for obtaining trust policy. For example, the network hardware 1314 may be connected to a trust server 1316 which includes a policy store 1318. The policy store 1318 may store various policies related to trust. The policies can be transmitted through the network hardware 1314 to the host 1302. The host trust manager 1306 references the policies to determine whether or not a file meets certain trust characteristic thresholds allowing the file to be operated on on the host operating 1302. Note that in an alternative embodiment, the host trust manager 1306 can provide trust characteristics to the trust server 1316 for evaluation. The trust server 1316 can indicate to the host trust manager 1306 whether or not the trust characteristics meet the threshold conditions. Note that in some embodiments, trust server 1316 may be composed of multiple distributed servers, and/or implemented as a cloud computing service.

FIG. 13 further illustrates a guest trust manager 1320. In some embodiments, the guest trust manager 1320 can determine that a file does not have sufficient trust characteristics to be operated on on the guest operating system 1304. Note that different guest operating systems may have different allowable trust characteristics, such that a given file may be prevented from being operated on on some guest operating systems, but allowed on others. In particular, a guest operating system may implement certain safeguards not implemented by other guest operating systems. Those safeguards can be used to allow certain files to be operated on on the guest operating system. However, in some embodiments, a file may not have sufficient trust to be operated on on any operating system associated with the host 1300.

In some embodiments, a user or process on the host operating system 1302 or on the guest operating system 1304 needs to ensure the trust characteristics of a particular file. In this example, trust is required for the guest file 1312. To acquire trust for the guest file 1312, the user or process queries the guest trust manager 1320, resulting in a query to the host trust manager 1306. The host trust manager 1306 then queries the trust server 1316 for a license. In some embodiments, a license is a requirement to acquire trust. In one example, to acquire trust for the guest file 1312, the license data for guest file 1312 is gathered by guest trust manager 1320 and/or host trust manager 1306, and when the query for trust is made to trust server 1316, the license data is also provided. Trust server 1316 may perform additional analysis on this license data prior to granting trust.

Figure 14:
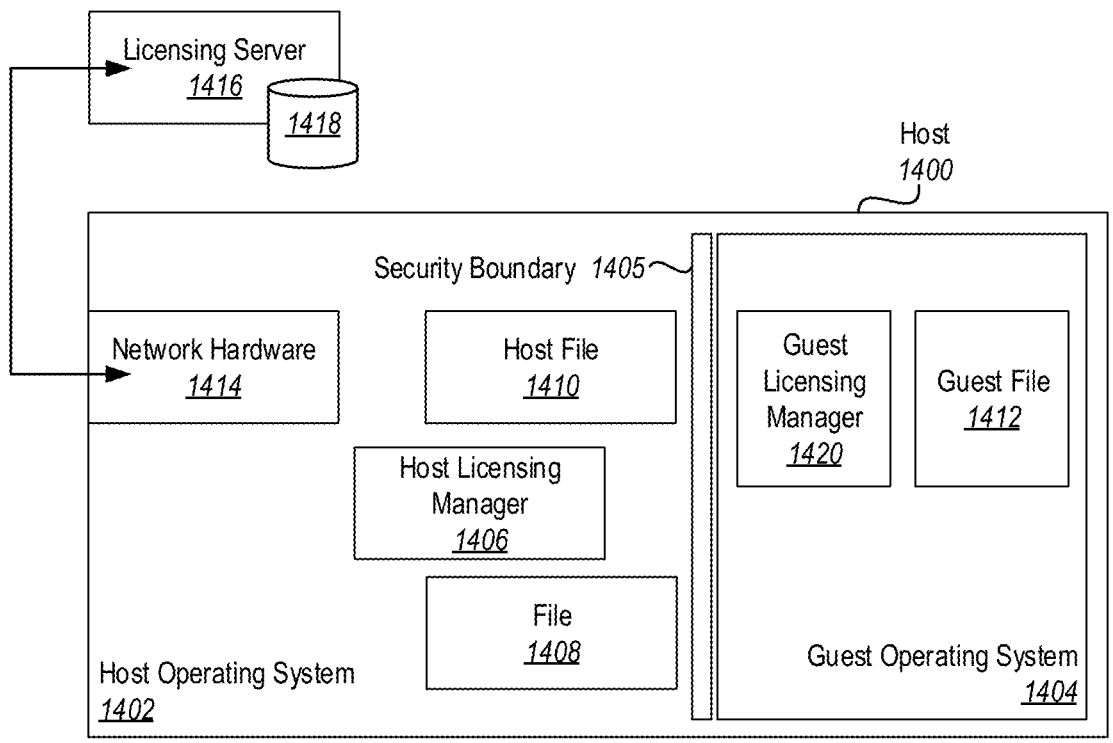
FIG. 14 illustrates a computing system having a host operating system and a guest operating system configured to perform operations on files based on licensing factors.

Referring now to FIG. 14, alternative embodiments are illustrated. FIG. 14 illustrates an example where decisions about where to perform file operations on a file on a host 1400 are determined based on licensing considerations. In particular, a file may be licensed for use on a host operating system 1402 or guest operating system 1404.

An operating system may be selected for a file to have file operations performed on it based on a number of different various licensing conditions. For example, in some embodiments, selection of an operating system on which to perform file operations on a file may be based on specific information in a license indicating the type of operating system on which the file should have file operations performed on it. Alternatively or additionally, an operating system may be selected based on the type of license granted.

As noted above, an operating system on which to perform file operations on a file may be based on specific information in a license. In the example illustrated in FIG. 14, a licensing server 1416 having a license store 1418 is connected through network hardware 1414 to the host 1400. When the host operating system 1402 has a file 1408 to be operated on, the host licensing manager 1406 can obtain a license for the file 1408 from the licensing server 1416. In some embodiments a license from the licensing server 1416 will indicate specifically what operating systems the file can have operations performed on it. For example, a license may indicate that operations should only be performed on the file on a guest operating system such as the guest operating system 1404. FIG. 14 illustrates a file 1412 on a guest operating system 1404. In some embodiments the licensing server 1416 may be composed of multiple distributed servers, and/or implemented as a cloud computing service.

In some embodiments, a user or process on the host operating system 1402 or on the guest operating system 1404 needs to acquire a license. In this example, a license is required for guest file 1412. To acquire the license, the user or process queries the guest license manager 1420, resulting in a query to the host license manager 1406. The host license manager 1406 then queries the licensing server 1416 for a license. In some embodiments trust is a requirement to acquire a license. In one example, to acquire a license for the guest file 1412, additional metadata about trust is gathered by the guest licensing manager 1420 and/or the host licensing manager 1406, and when the query for a license is made to licensing server 1416, this additional data about trust is also provided. This may include information about the file itself, and/or additional information about the computer, the user, the location, the owner of the computer, and so forth. Licensing server 1416 may perform additional analysis on this trust data prior to granting the license.

Licensing for file operations on a file on a guest operating system may be specified for any one of a number of different factors. For example, in some embodiments, a content provider may wish to provide files in different versions. In some embodiments, a license may specify that certain versions of the file are only to be opened, or otherwise operated on, in particular types of guest operating systems having limited functionality. In this way, the content provider can enforce content restrictions for lower tier versions of the files. Thus, for example, if a lower tier version of the file has a particular information that should be excluded, the license may specify that the file is only to be opened in a certain type of lower tier guest operating system. In this way, the content provider can enforce strong restrictions on content access. Alternatively, a content provider may require the content to be opened on a host operating system. As noted, this may be specified in the license such that upper tier versions of the file are prevented from being operated on on the guest operating system. This may be done as a form of quality control to prevent upper tier versions of files from being operated on on less functional operating systems.

Alternatively or additionally, short-lived licenses may specify that a files be opened on a guest operating system 1404. In some embodiments, the guest operating system 1404 may be specifically instantiated for such short-lived licenses. For example, if a file is licensed as a short-lived file, storing, opening, or copying the file may cause the guest operating system 1404 to be instantiated and the file 1412 to be opened (or otherwise operated on) on the guest operating system 1404. When the license expires for the file 1412, the entire guest operating system 1404 may be destroyed, thus effectively enforcing the short-lived license. In this example, the license may specify that the file 1412 is only to be opened (or otherwise operated on) on a guest operating system that expires within the timeframe specified in the short-lived license.

Alternatively or additionally, event-based licenses may specify that a file be opened (or otherwise operated on) on a guest operating system 1404. In some embodiments, the guest operating system 1404 may be specifically instantiated for such event-based licenses. Similar to time-based licenses, when the event-based license expires, the entire guest operating system 1404 may be destroyed, thus effectively enforcing the short-lived license. In this example, the license may expire due to a notification or event.

In an alternative or additional embodiment, a file may be operated on based on the type of license, without the license specifically indicating where the file should be operated on. For example, as illustrated above, the license being for a lower tier version of a file may be used to determine that the file should be opened (or otherwise operated on) on a guest operating system.

Some embodiments may operate on files having short-lived license on the guest operating system 1404 without the short-lived license specifying that the file should be opened (or otherwise operated on) the guest operating system. Rather, embodiments may simply operate on any file associated with a short-lived license on guest operating systems.

FIG. 14 illustrates both a host licensing manager 1406 and a guest licensing manager 1420. The guest licensing manager 1420 may include functionality for determining whether or not the guest file 1412 can be opened (or otherwise operated on) on the guest operating system 1404. Thus, it should be noted, that in some embodiments, licensing will not allow a file to be opened (or otherwise operated on) on either the host operating system 1402 or the guest operating system 1404. The guest licensing manager 1420 can enforce these licensing requirements with respect to the guest operating system 1404.

Note that the host licensing manager 1406 and guest licensing manager 1420 may be communicatively coupled to allow communication between the two licensing managers. This may be useful for a number of different reasons. In some embodiments this may be useful to ensure that licensing is not double counted, which might hamper the usability of the file, cause an incurrence of unnecessary monetary costs to the end user, incur support costs to the content provider, etc. For example, a particular user of the host 1400 may purchase a license from a content provider. In some embodiments, it may be desirable to allow that particular user to operate on a file on multiple operating systems so long as those operating systems reside on the same host. Thus, the user would be able to operate an instance of the file 1410 on the host operating system 1402 and an instance of the file 1412 on the guest operating system 1404 without needing to acquire two licenses for the file. The host licensing manager 1406 and guest licensing manager 1420 could coordinate these operations on different operating systems in communication with the licensing server 1416 to ensure that the user is in compliance with licensing agreements. In some embodiments, the licensing server 1416 will pre-generate file licenses for guest file 1412, enabling multiple instances of guest file 1412 in guest operating system 1404 to run on a given host operating system 1402. In this embodiment, licensing server may know the unique identifiers of host operating system 1402, a specific user identity that has the privilege to operate on files on host operating system 1402 and/or guest operating system 1404. Note that in some embodiments, the guest licensing manager 1420 will not communicate with the licensing server 1416 directly, but rather will rely on the host licensing manager 1406 to make appropriate decisions on behalf of the guest licensing manager 1420.

The host licensing manager 1406 and guest licensing manager 1420 may communicate in a number of different fashions. For example, in some embodiments the host licensing manager 1406 and guest licensing manager 1420 may communicate through shared memory. Using shared memory allows for a secure communication channel to be established to prevent theft of licensing information. Alternatively or additionally, the host licensing manager 1406 and guest licensing manager 1420 communicate using direct messaging. Alternatively or additionally, the host licensing manager 1406 and guest licensing manager 1420 communicate using direct memory access (DMA). Etc.

Figure 15:
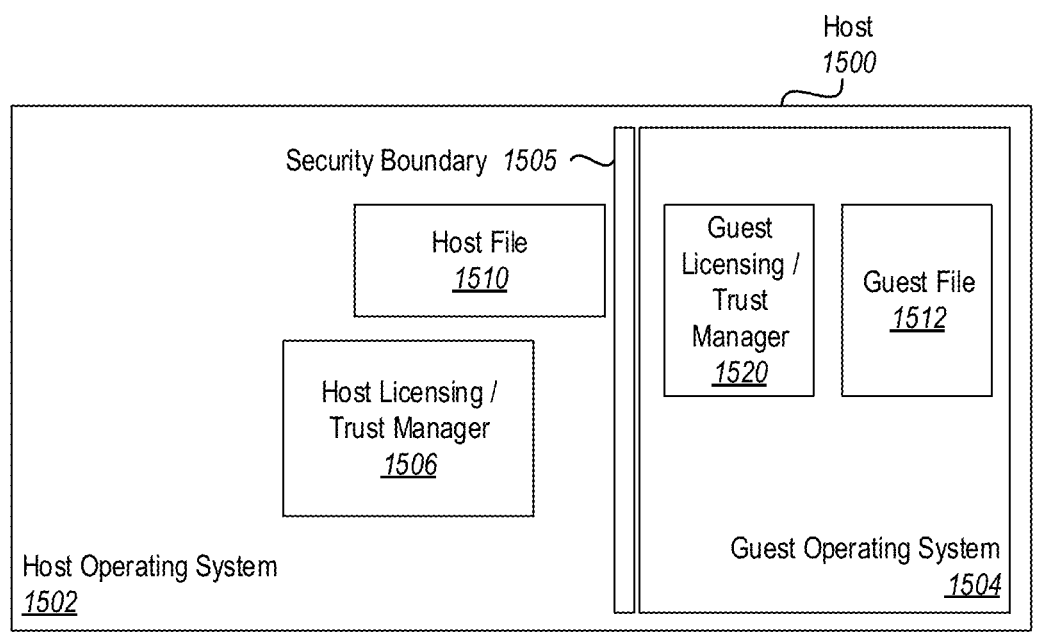
FIG. 15 illustrates a computing system having a host operating system and a guest operating system configured to perform operations on files based on trust and/or licensing factors.

Referring now to FIG. 15 an additional example is illustrated. In this example, decisions about where to operate on files is based on both licensing and trust considerations. In particular, in some embodiments both a licensing characteristic and a trust characteristic must meet predetermined thresholds for the file 1510 to be operated on on the host operating system 1502. If a file cannot meet both thresholds, then the file 1512 will be potentially opened (or otherwise operated on) on the guest operating system 1504. Note that the various licensing and trust factors described above may be used in conjunction with one another in various ways to determine where a file will be operated on.

Figure 16:
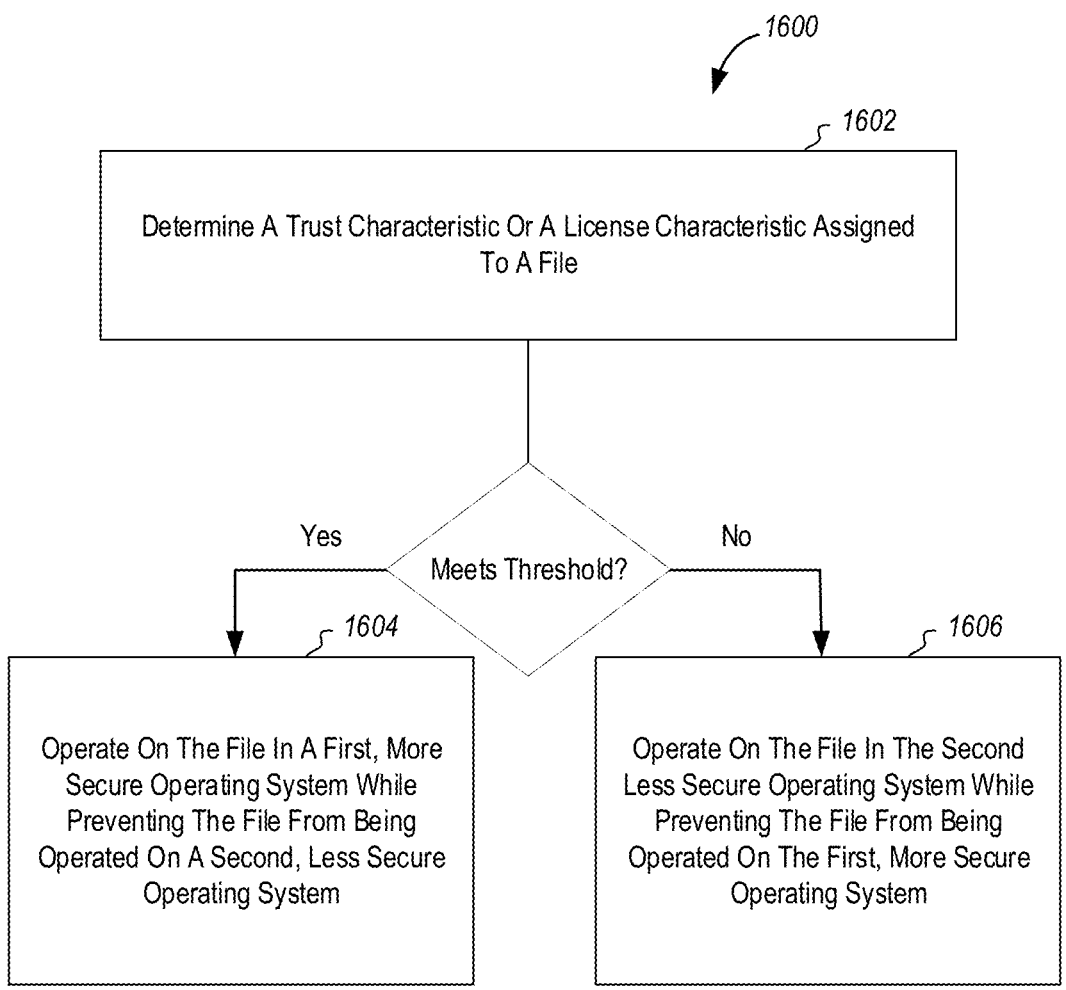
FIG. 16 illustrates a method for securely performing operations on files.

Referring now to FIG. 16, a method 1600 is illustrated the method includes acts for securely performing operations on files. The method 1600 includes an act of determining a trust characteristic or a license characteristic assigned to a file (act 1602). Various characteristics have been described in detail above.

When the trust characteristic or the license characteristic assigned to the file meets or exceeds a predetermined trust condition or the predetermined license condition, then the method 1600 includes performing operations on the file in a first, more secure operating system while preventing the file from, being operated on in a second, less secure operating system (act 1604). For example, FIG. 13-15 illustrate that a file can be opened (or otherwise operated on) on a host operating system (1302, 1402, 1502) when certain trust and/or licensing conditions are met.

When the trust characteristic or the license characteristic assigned to the file does not meet or exceed the predetermined trust condition or the predetermined license condition, then the method 1600 further includes performing operations on the file in the second less secure operating system while preventing the file from being operated on in the first, more secure operating system (act 1602). FIGS. 13-15 above illustrate that files not meeting certain trust and/or licensing conditions are operated on in a guest operating system (1304, 1404, 1504).

The method 1600 may further include launching the second, less secure operating system as a result of determining that the trust characteristic or the license characteristic assigned to the file does not meet or exceed the predetermined trust condition or the predetermined license condition. For example, a guest operating system may be specifically launched to host the file. In some embodiments, the guest operating system may be launched with specific characteristics so as to limit the functionality of the file for security or licensing reasons.

The method 1600 may further include storing the file in the first, more secure operating system, but opening or copying the file in the second, less secure operating system as a result of determining that the trust characteristic or the license characteristic assigned to the file meets or exceeds the predetermined trust condition. Thus, in some embodiments, even though the trust characteristics allow the file to be saved in a more secure operating system, the file may be nonetheless opened in a less secure operating system.

The method 1600 may further include storing the file in the first, more secure operating system, but opening the file in the second, less secure operating system as a result of determining that the trust characteristic or the license characteristic assigned to the file meets or exceeds the predetermined trust condition or the predetermined license condition and as a result of evaluating a type for the file. For example, certain types of files, that are highly susceptible to malware attacks, hijacking attacks, or other attacks, may be opened in guest operating system.

The method 1600 may be performed where the license characteristic is based on trust characteristics for the file. For example, certain trust characteristics may be evaluated, and that evaluation can result in a license having certain characteristics. For example, a file may be determined to be untrusted or of a low-trust value. This information can cause a license to be issued with restricts the file only for use on guest operating system.

The method 1600 may be performed where determining a condition of a trust characteristic assigned to a file comprises evaluating content provider preferences. Thus, a content provider can specifically specify whether a host operating system or a guest operating system should be used to operate on a file.

The method 1600 may be performed where and licensing characteristics are used to determine where a file should have file operations performed on it. In this particular example, the method acts of method 1600 include determining a trust characteristic and a license characteristic assigned to a file. When the trust characteristic and the license characteristic assigned to the file meet or exceed the predetermined trust condition and the predetermined license condition, then the method 1600 includes operating on the file in a first, more secure operating system while preventing the file from, being operated on in a second, less secure operating system. When the trust characteristic or the license characteristic assigned to the file does not meet or exceed the predetermined trust condition or the predetermined license condition, the method 1600 includes operating on the file in the second less secure operating system while preventing the file from being operated on in the first, more secure operating system.

The method 1600 may be practiced where determining a license characteristic comprises determining whether the license is a short-lived license or a long-lived license according to some predetermined criteria.

The method 1600 may be practiced where the operation on the file comprises a copy operation of the file, and the predetermined threshold comprises that the file will have the same trust level or licensing level as a new copy of the file.

The method 1600 may be practiced where the operation on the file comprises a copy operation of the file, and the predetermined threshold comprises the file already having the same trust level or licensing level as a new copy of the file.

The method 1600 may be practiced where the operation on the file comprises a copy operation of the file, and the predetermined threshold comprises that the file will have a lower trust level or licensing level than a new copy of the file.

The method 1600 may be practiced where performing the file operation on the file in the second less secure operating system comprises the second less secure operating system writing the file to a file system on the first more secure operating system.

The method 1600 may further include at least one of encrypting the file on the first more secure operating system, de-duplicating the file on the first more secure operating system, or performing a data conversion of the file on the first operating system.

The method 1600 may further include decrypting the file on the first more secure operating system prior to performing the file operation.

The method 1600 may further include running the file through diagnostic software on the first more secure operating system prior to performing the file operation.

The method 1600 may be practiced where the license characteristic is based on a trust characteristics for the file.

The method 1600 may be practiced where the license characteristic is based on an event-based license that expires as the result of an event occurring.

The method 1600 may be practiced where the license characteristic is based on a pre-generated file license.

The method 1600 may further include causing at least one of a first operating system licensing manager a second operating system licensing manager to ensure multiple licenses are not acquired for the same file operated on on a single host computing system.

Further, the embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A computer system, comprising:
one or more processors; and
a memory operatively coupled to the one or more processors, the memory having stored thereon instructions that are executable by the one or more processors to cause the computer system to provide a host operating system and a container operating system isolated from the host operating system by a secure boundary on the computer system, the instructions are also executable by the one or more processors to cause the computer system to:
upon receiving, at the container operating system, a request for performing a file operation on a file stored in the computer system,
determine, at the host operating system, a trust level or a license level assigned to the file, the trust level representing a level of security threat to the host operating system from performing the requested file operation on the file;
in response to determining that the trust level or the license level assigned to the file meets or exceeds a predetermined trust threshold or a predetermined license threshold, respectively,
issue a notification to the container operating system indicating access is denied for performing the file operation of the request in the container operating system; and
perform the requested file operation on the file in the host operating system while access is denied to the container operating system for performing the file operation in the container operating system is denied; and
in response to determining that the trust level or the license level assigned to the file does not meet or exceed the predetermined trust threshold or the predetermined license threshold, respectively,
performing the requested file operation on the file in the container operating system; and
preventing the file operation from being performed directly in the host operating system.

2. The computer system of claim 1, wherein the file operation on the file comprises a copy operation of the file, and wherein the predetermined trust threshold comprises that the file to have the same trust level or licensing level as a new copy of the file.

3. The computer system of claim 1, wherein the file operation on the file comprises a copy operation of the file, and wherein the predetermined trust threshold comprises that the file already has the same trust level or licensing level as a new copy of the file.

4. The computer system of claim 1, wherein the file operation on the file comprises a copy operation of the file, and wherein the predetermined threshold comprises that the file will have a lower trust level or licensing level than a new copy of the file.

5. The computer system of claim 1, wherein performing the file operation on the file in the container operating system comprises the container operating system writing the file to a file system on the host operating system.

6. The computer system of claim 1, wherein the instructions are executable to further cause the computer system to perform at least one of encrypting the file on the host operating system, de-duplicating the file on the host operating system, or performing a data conversion of the file on the host operating system.

7. The computer system of claim 1, wherein the instructions are executable to further cause the computer system to decrypt the file on the host operating system prior to performing the file operation.

8. The computer system of claim 1, wherein the instructions are executable to further cause the computer system to run the file through diagnostic software on the host operating system prior to performing the file operation.

9. A method performed in a computer having a processor and a memory containing instructions executable by the processor to provide a host operating system and a guest operating system isolated from the host operating system by a secure boundary, comprising:
receiving, at the guest operating system, a request for performing a file operation on a file stored in computer; and
upon receiving the request,
determining, at the host operating system, a trust level or a license level assigned to the file, the trust level representing a level of security threat to the host operating system from performing the requested file operation on the file;
in response to determining that the trust level or the license level assigned to the file meets or exceeds a predetermined trust threshold or a predetermined license threshold, respectively, issuing a notification to the container operating system indicating that access is denied to performing the file operation in the guest operating system and performing the requested file operation on the file in the host operating system in response to the received request for performing the file operation on the file; and
in response to determining that the trust level or the license level assigned to the file does not meet or exceed the predetermined trust threshold or the license threshold, respectively, performing the requested file operation on the file in the guest operating system while preventing the file operation from being performed in the host operating system.

10. The computer system method of claim 9 wherein the operation on the file comprises a copy operation of the file, and wherein the predetermined trust threshold comprises that the file to have the same trust level as a new copy of the file.

11. The computer method of claim 9 wherein the operation on the file comprises a copy operation of the file, and wherein the predetermined trust threshold comprises the file already having the same trust level as a new copy of the file.

12. The computer method of claim 9 wherein the operation on the file comprises a copy operation of the file, and wherein the predetermined trust threshold comprises that the file to have a lower trust level than a new copy of the file.

13. The computer method of claim 9 wherein performing the file operation on the file comprises writing the file to a file system on the host operating system.

14. The computer method of claim 9, further comprising performing at least one of encrypting the file on the host operating system, de-duplicating the file on the host operating system, or performing a data conversion of the file on the host operating system.

15. The computer method of claim 9, further comprising decrypting the file on the host operating system prior to performing the file operation.

16. The computer system method of claim 9, further comprising running the file through diagnostic software on the host operating system prior to performing the file operation.

17. A method performed in a computer having a processor and a memory containing instructions executable by the processor to provide a host operating system and a guest operating system isolated from the host operating system by a secure boundary, comprising:
detecting a file operation request directed to a file stored in the computer is received in the guest operating system; and
upon receiving the request,
determining, at the host operating system, a trust level or a license level assigned to the file by accessing metadata of the file, the trust level representing a level of security threat to the host operating system from performing the requested file operation on the file;
in response to determining that the trust level or the license level assigned to the file meets or exceeds a predetermined trust threshold or a predetermined license threshold, respectively, issuing a notification to the guest operating system indicating access is denied to performing the file operation in the guest operating system and performing the requested file operation on the file in the host operating system in response to the received request for performing the file operation on the file; and
in response to determining that the trust level or the license level assigned to the file does not meet the predetermined trust threshold or the predetermined license threshold, respectively,
preventing the file operation from being performed in the host operating system; and
performing the file operation in the guest operating system by exchanging data with the host operating system without exposing a file system of the host operating system to the guest operating system.

18. The method of claim 17 wherein:
the file operation includes a file save operation directed to the file; and
performing the file operation in the guest operating system includes communicating data of the file from the guest operating system to the host operating system via an interprocess communication call; and managing the received data of the file on the host operating system without exposing the file system of the host operating system to the guest operating system.

19. The method of claim 17 wherein:

the file operation includes a file open operation directed to the file; and performing the file operation in the guest operating system includes communicating data of the file from the host operating system to the guest operating system via an interprocess communication call; and opening the received data of the file in the guest operating system without exposing the file system of the host operating system to the guest operating system.

20. The method of claim 17 wherein:

the file operation includes a file open operation directed to the file; and in response to determining that the trust level assigned to the file meets or exceeds the predetermined trust threshold, performing the file operation in the host operating system includes:

opening the data of the file in the host operating system; and preventing the file from being opened in the guest operating system.

* * * * *